BLOCK SYNCHRONIZATION CIRCUIT FOR A DATA COMMUNICATIONS SYSTEM

Filed Aug. 10, 1966 8 Sheets-Sheet 1

INVENTOR
WALTER B. MCCLELLAND

BY [signature]

ATTORNEY

BLOCK SYNCHRONIZATION CIRCUIT FOR A DATA COMMUNICATIONS SYSTEM

Filed Aug. 10, 1966 8 Sheets-Sheet 2

Oct. 14, 1969 W. B. McCLELLAND 3,473,150

BLOCK SYNCHRONIZATION CIRCUIT FOR A DATA COMMUNICATIONS SYSTEM

Filed Aug. 10, 1966 8 Sheets-Sheet 3

Oct. 14, 1969 W. B. McCLELLAND 3,473,150

BLOCK SYNCHRONIZATION CIRCUIT FOR A DATA COMMUNICATIONS SYSTEM

Filed Aug. 10, 1966 8 Sheets-Sheet 5

BLOCK SYNCHRONIZATION CIRCUIT FOR A DATA COMMUNICATIONS SYSTEM

Filed Aug. 10, 1966 8 Sheets-Sheet 7

United States Patent Office 3,473,150
Patented Oct. 14, 1969

3,473,150

BLOCK SYNCHRONIZATION CIRCUIT FOR A DATA COMMUNICATIONS SYSTEM

Walter B. McClelland, Park Ridge, Ill., assignor to Teletype Corporation, Skokie, Ill., a corporation of Delaware Filed Aug. 10, 1966, Ser. No. 571,540
Int. Cl. H04q 1/20
U.S. Cl. 340—163 13 Claims

ABSTRACT OF THE DISCLOSURE

A system for maintaining block synchronization in a high speed error detection and correction system uses full-duplex transmission with each block being identified by one of three identification numbers. During normal error-free transmission, the reverse channel from the receiver is "on"; but when an error is detected at the receiver, the reverse channel is turned "off." The transmitter then retransmits the last two blocks, and the block numbers preceding these blocks are checked at the receiver. If the first block number is in the proper sequence, both blocks are recorded. If the first block number is "low," the receiver does not record the first retransmitted block, but does record the second. If the first block number is "high" the receiver does not record and again turns "off" the reverse channel, causing the transmitter to reverse and retransmit two blocks after retransmission of the first or "high" block is completed.

In the transmission of messages or data by means of telegraph facilities, it often becomes necessary to insure that the messages or data transmitted are recorded free of any errors. This becomes especially important in the transmission of numerical data since errors which occur in any given data character, encoded in binary permutation code, merely transform the desired data character into another data character. When this occurs, there usually is not way for the recipient of the data to know that such a transposition has taken place. As a consequence, it has become common in the data communication art to transmit information in the form of blocks of characters with a parity check character or characters being transmitted at the end of each block. This parity check character generally is a character generated by taking a horizontal or spiral parity check over all of the information bits transmitted in the block. At the receiver a similar parity check character is generated based on a parity check made over the data as received at the receiver. The parity check character transmitted from the transmitter and the parity check character generated at the receiver are compared at the receiver; and if they agree, the block transmitted is assumed to be correct and is recorded. If the comparison between the parity check characters indicates disagreement, the receiving station notifies the transmitting station that the block which preceded the pairty check character was in error; and the transmitter retransmits this block from storage. Thus, in the event that error-free transmission is taking place, transmission is continuous with the exception of the insertion of the parity check characters. Very little line time is wasted in the error checking operation since the parity check character provides an error check for a large number of information characters (for example, 80 information characters may constitute a block on which the parity check is made).

Although the basic idea of providing block transmission, as outlined above, in a full duplex system allows high speed transmission of information, as transmission speeds increase to the order to 1,000 or 2,000 words per minute or more, extra precautions must be taken in order to assure that block synchronization between the transmitting station and the receiving station is maintained. This is necessary especially in full duplex operation in which transmission is continuous, that is, in which the transmitter begins transmitting a second block immediately after transmitting the parity check character for the previous block without waiting for a signal from the receiver indicating whether or not the previous block was errored or error free. As a consequence, during the second block the transmitter receives a signal from the receiver indicating the status of the first block as received. If this signal indicates that a block was in error, it is possible under certain conditions of operation for transmitting station to repeat one block when a different preceding block actually was errored.

As a result, it has become necessary in high speed data transmission systems to have some means of identifying the blocks; so that recording at the receiver of only the proper blocks is assured.

Accordingly, it is an object of this invention to maintain block synchronization in a high speed data communications system.

It is a further object of this invention to maintain block synchronization in a high speed data communications system using block counters at both the transmitting station and the receiving station for identifying the blocks transmitted and received.

It is a still further object of this invention in a block synchronization system for a data communications system having block counters at the transmitting and receiving stations to compare the block number transmitted with the block number obtained from the receiving station counter in order to insure that the transmitting and receiving stations are in block synchronization.

It is an additional object of this invention to maintain block synchronization between the transmitting and receiving stations in a full duplex data communications system under all conditions of operation including long or short noise bursts on either the send or receive channels.

These and other objects are accomplished in accordance with a preferred embodiment of the invention in which a transmitting station transmits data bits having one of at least two conditions to a receiving station. A predetermined number of the data bits are encoded in permutation code to constitute a character, and a predetermined number of these characters constitute a block of information. Block counters are provided at both the transmitting and receiving stations, and these block counters are normally advanced one count each time the number of characters transmitted or received is equal in number to the number of characters in a block.

At the end of each block of transmission, the transmitting station transmits an error checking character, such as a parity check character, to the receiving station where it is compared with a check character generated at the receiving station. Both of these check characters are based on a check made over the transmitted and received blocks, respectively. If the transmission was error free, a comparison of the check characters at the receiver will indicate agreement between them. If the check characters are in disagreement, this is indicative of an error somewhere in the block over which the check was made; and retransmission of that block of information is required.

Since relatively few errors occur in normal transmission, the system provides for continuous transmission with the exception of the insertion of a block number at the beginning and the insertion of a parity check character at the end of each block. The transmitting station does not wait for notification from the receiving station that a transmitted block was or was not properly received before transmitting the next block. In the event that an error occurs in a transmitted block, provision is made at both the transmitting and receiving stations for allowing the record medium to be pulled back or reversed a predetermined number of blocks under control of a station control programmer.

At the receiver, the information is recorded by a suitable recording device such as a reperforator or magnetic recorder. If the parity check comparison at the receiving station indicates disagreement between the parity check characters, the receiving station sends an error indication signal back to the transmitting station over the reverse channel linking the two stations. The transmitting station, at the time it receives this error indication signal, already has proceeded with transmission of the next succeeding block. At the receiver, the block counter and the recording apparatus are rendered nonresponsive to this next succeeding block and the recording medium is reversed one full block to the end of the last correctly received block recorded therein. The errored block then is deleted by over-punching deleate characters in the tape if a reperforator is used as a recorder, or is erased from the tape if a magnetic tape recorder is used.

At the transmitter, the record medium is reversed two full blocks when the transmitter reaches the end of the block which was being transmitted at the time the error signal indication was received from the receiving station. This then places the first character of the errored block in position for retransmission from the transmitting station. The transmitter block counter also is reversed to the count which corresponds to the errored block, and the transmitting station precedes retransmission of this block of information with this proper block number. The transmitted block number is compared with the corresponding block number of the block which the receiving station expects to receive. If the transmitted block number is the number expected by the receiving station, the system is in block synchronization; and the receiving station records all subsequent transmission from the transmitting station.

If at any time the block number transmitted by the transmitting station is low with respect to the block number expected by the receiving station, the recording apparatus at the receiving station is rendered nonresponsive to the first block of information transmitted to the receiving station; but the next succeeding block of information will be identified by the expected block number and this next succeeding block is recorded. If at any time the block number transmitted by the transmitting station is high with respect to the block number expected by the receiving station, an error indication signal is sent immediately on the reverse channel from the receiving station to the transmitting station, causing the transmitter to reverse two full blocks as soon as transmission of the "high" block is completed. The receiver records the "high" block as being errored and then deletes the block from the record medium. Retransmission of two blocks then takes place, and the block numbers should be in agreement. Since the transmitted block number is compared with the expected block number at the receiver in conjunction with each block of information transmitted, with the receiver being rendered nonresponsive or causing retransmission in the manner indicated above, block synchronization is maintained in spite of line hits, noise, or temporary disconnects on either line.

Other features and objects of this invention will become apparent to those skilled in the art from the following detailed description of the system considered in conjunction with the accompanying drawings in which:

FIG. 1 is a block diagram of the system according to the preferred embodiment of the invention;

FIG. 2 illustrates the manner in which

FIGS. 3 to 5 are circuit diagrams of a transmitting station in accordance with a preferred embodiment of the invention; and FIGS. 6 to 10 are circuit diagrams of a receiving station in accordance with a preferred embodiment of the invention.

General description

Figures 1, 2:
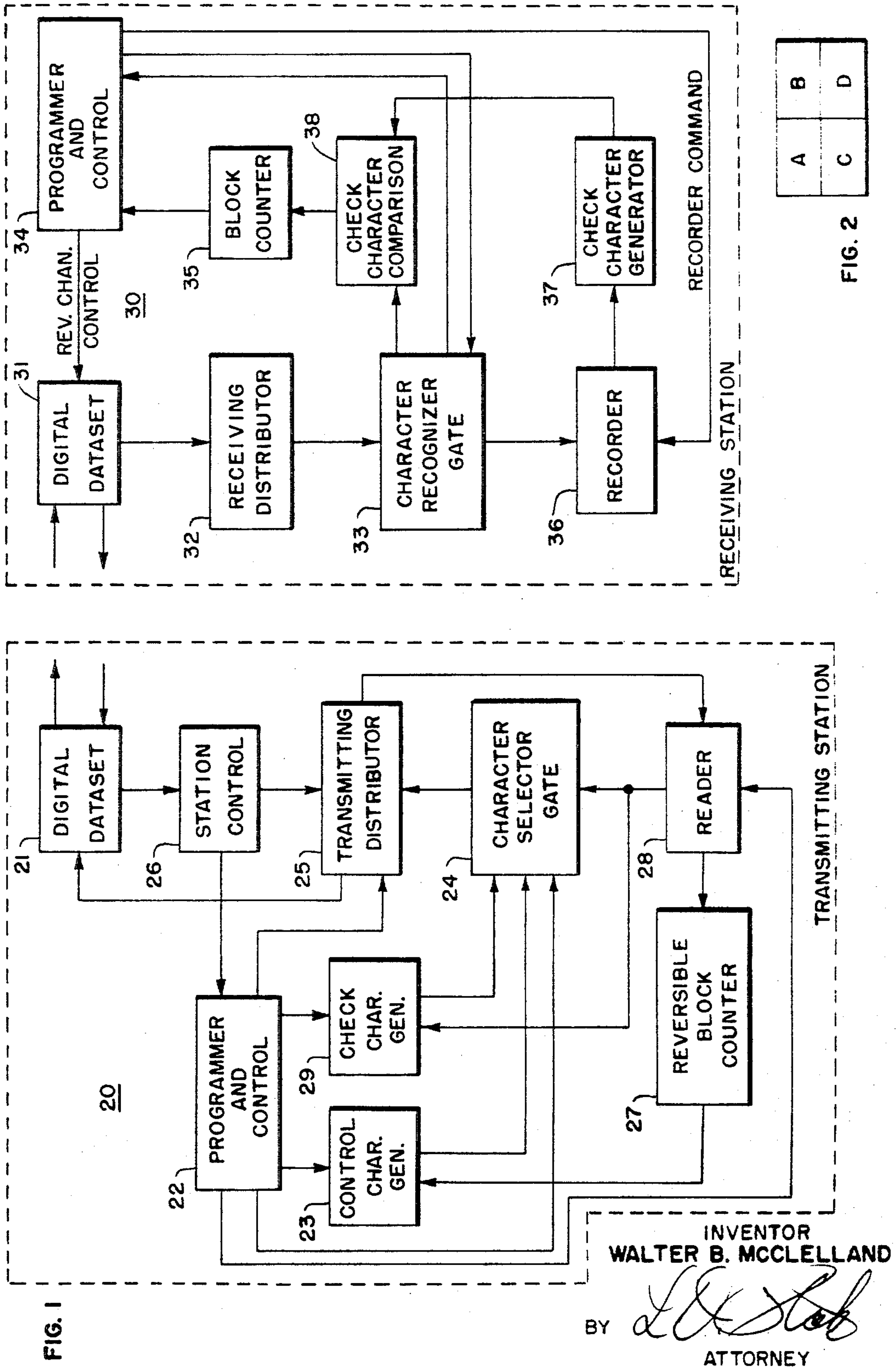

Referring now to FIG. 1 there is shown a block diagram of a typical error detection and correction system with which the block synchronization system of this invention may be utilized. A transmitting station is generally indicated at 20 and a receiving station is indicated at 30. The transmitting and receiving stations 20 and 30 may be interconnected through conventional telephone digital datasets 21 and 31 which transmit in two directions simultaneously, neither direction affecting the other. When it is desired to initiate transmission from the transmitting station 20 to the receiving station 30, the operator at the transmitting station makes a telephone connection through the digital dataset 21 at the transmitting station to the digital dataset 31 at the receiving station. After a telephone connection has been made and following a predetermined time interval, the transmitting station may initiate the transmission of data to the receiving station.

Prior to the sending of any message or information data, the transmitting station sends a predetermined character which may be called "sender ready" (SR) character to the receiving station. This "sender ready" or SR mode of operation of the transmitting station is established under control of a programmer and control circuit 22 which causes a control character generator matrix 23 to supply an SR character through a character selector gate 24 to the transmitting distributor 25 which in turn supplies the SR character through the digital dataset 21 over the outgoing line to the receiving station. When the receiving station acknowledges receipt of the SR character, it "turns on" the reverse channel to the transmitting station, that is a signal is supplied to the transmitting station from the receiving station indicating that the receiving station is ready to receive information. In the preferred embodiment of the invention, the return signal prior to this acknowledgement is a steady state "off" signal on the reverse channel which remains "off" until the receiving station acknowledges the SR character supplied to it from the transmitting station 20.

When the return signal "on" is received by the dataset 21 at the transmitting station 20, it is supplied to a station control circuit 26 which causes the programmer and control circuit 22 to advance to its next mode of operation, during which the transmitting station sends a block number to the receiving station to identify the particular block of information characters which then is to be transmitted. The block number is obtained from the output of a reversible block counter 27 which is advanced once for each block of information read by a conventional telegraph paper or magnetic tape reader 28. At this time, whatever count or block number is present in the block counter 27 is supplied to the control character generator 23, the output of which is a character corresponding to the block number. The block number then is supplied through the character selector gate 24 and the transmitter distributor 25 to the receiving station.

The programmer and control circuit 22 then advances to the data mode of operation disabling the control character generator 23, which in turn enables the characted selector gate 24 to be responsive to the output of the reader 28. When this occurs, the reader 28 commences reading of the information tape and the information contained therein is supplied through the character selector gate 24 and the transmitting distributor 25 to the digital subset 21 in a conventional manner. The reader 28 may be of the type disclosed in the copending application Ser. No. 358,285, filed Apr. 8, 1964 in the name of J. L. DeBoo and assigned to the same assignee as the present invention.

When the number of characters read by the reader 28 is equal in number to the number of characters in a block, the programmer and control circuit is advanced to an end-of-block (EOB) mode and causes an end-of-block (EOB) character to be supplied from the control character generator 23 to the character selector gate 24 from which it is supplied to the transmitter distributor 25 for distribution through the digital dataset 21 to the receiving station. At the same time the receiving station should be in an end-of-block mode of operation, and the transmitted EOB character is compared with the EOB character generated in the receiving station in order to insure that a full block of information was received by the receiving station 30.

During the time that information is supplied from the reader 28 to the distributor 25, the output of the reader 28 also is supplied simultaneously to a parity check character generator 29, which may be of the type disclosed in Patent No. 3,242,461, issued Mar. 22, 1966 to S. Silberg and R. D. Slayton and assigned to the same assignee as the present invention. Following transmission of the end-of-block character, the transmitting station programmer and control circuit 22 advances to the check character mode of operation; and the reverse channel is sampled to determine whether it is "on" or "off." If the reverse channel is "on," the character stored in the check character generator 29 is supplied through the character selector gate 24 to the transmitting distributor 25 and over the previously described path to the receiving station 30. The programmer and control circuit 22 then resets to the block number mode of operation, and the check character generator 29 also is reset. The block number now in the block counter 27, which was advanced one count when the end of the previous block was reached, is supplied through the control character generator 23 and the character selector gate 24 to transmitter distributor 25 and the foregoing sequence of operation is repeated.

In the event that an error occurred in the previous block, or if the transmitted block number was "high" with respect to the block number expected by the receiving station 30, or if the receiving station did not receive an EOB character when it was in the EOB mode of operation, the receiving station 30 causes the reverse channel signal to be turned "off." The reverse channel is turned "off" at the beginning of the block on a block "high" condition and is turned "off" at the end of the block on a wrong EOB character or detected error.

If the reverse channel is detected "off" by the transmitter during its EOB mode of operation, transmission of the check character is inhibited while the programmer steps through the check character mode of operation. The station control circuit 26 then causes the programmer and control circuit 22 to be advanced to a reverse mode of operation following completion of transmission of the block of information which was being transmitted during the time the reverse channel was turned "off." During the reverse mode of operation, the transmitter distributor 25 is rendered insensitive to any input signals; so that no transmission takes place from the transmitting station. At the same time, the record medium in the reader 28 is caused to reverse two full blocks of information. The reversible block counter 27 also is reversed so that the count contained therein corresponds to the count which originally preceded the block of information which is in position to be retransmitted by the transmitting station 20 following the two block reversal. The programmer and control circuit 22 then advances to the SR mode of operation, and the cycle of operation which occurred when transmission was first initiated is repeated.

The receiving station cannot respond to any transmitted data until it recognizes the SR characters sent to it at the beginning of transmission or retransmission by the sending station 20. These characters are supplied through a conventional receiving distributor 32 to a character recognizer gate 33. When an SR character is recognized in the gate 33, an output signal is supplied to a programmer and control circuit 34 which supplies a reverse channel control signal to the digital subset 31 turning "on" the reverse channel. This causes the transmitting station 20 to advance to its block number mode of operation in the manner described previously.

The next character transmitted to the receiving station 30 from the transmitting station 20 then is the block number preceding the block of information to be transmitted. This block number is identified in the character recognizer gate 33 and is supplied to the programmer and control circuit 34 where it is compared with the block number obtained from the output of the receiving station block counter 35. If the received block number is the same as the block number obtained from the output of the counter 35, the programmer and control circuit 34 enables a recorder 36 allowing it to record subsequent data which is supplied by the receiving distributor 32 through the character recognizer gate 33 to the recorder 36. The recorder 36 may be a magnetic tape recorder or a paper tape reperforator of the type disclosed in Patent No. 3,056,546, granted Oct. 2, 1962 to W. J. Zenner. The information recorded by the recorder 36 also is supplied to a check character generator 37 which is of the same type as the check character generator 29 in the transmitting station. This check character generator 37 generates a parity check character on the block of information received which should correspond to the parity check character generated by the character generator 29 at the transmitting station on the same block of information.

The programmer and control circuit 34 is advanced to the end-of-block mode of operation after the receiving station 30 has received a number of characters equal to the number of characters in a block of information. If the next character received by the receiving station 30 is not an end-of-block character, an error is indicated and the reverse channel is turned "off." If an end-of-block character is received as expected, the reverse channel remains turned "on."

Following the end-of-block character, the transmitted parity check character is received and is compared with the locally generated parity check character obtained from the output of the parity check generator 37. If the parity check characters are the same, the output of the comparison circuit 38 causes the programmer and control circuit to reset to the block number mode of operation and the foregoing cycle of operation is repeated with the exception that the SR mode of operation is not utilized. Also, when the check character comparison circuit 38 detects that the received parity check character and the parity check character obtained from the output of the character generator 37 are the same, the block counter 35 is advanced one count. So long as normal error free operation continues to take place, the foregoing sequence of operation occurs.

If the transmission is initiated, or at any time during transmission of information from the transmitting station 20 to the receiving station 30, the transmitted block number is lower than the block number obtained from the output from the block counter 35, the programmer and control circuit 34 continues to supply a reverse channel signal through the digital subset 31 to the transmitting station 20. At the same time, however, the recorder 36 is rendered nonresponsive to the block of information which follows this "low" block number and no parity check character comparison is made at the end of that particular block. The block counter 35 is not advanced at the end of the block, so that the next block number received should correspond to the block number obtained from the output of the block counter 35. If the block numbers correspond, the recorder is allowed to respond to the data information signal supplied to it; and the system then is in block synchronization.

At any time during transmission of data from the transmitting station 20 to the receiving station 30 that the block number transmitted is "high" compared to the block number obtained from the block counter 35, the programmer and control circuit 34 at the receiving station causes the reverse channel signal to be turned "off," causes the recorder to delete the incoming block as soon as reception is completed, and resets to the SR mode of operation. As stated previously, this causes the transmitting station to reverse two full blocks following completion of transmission of the block of information which followed this "high" block number. Upon acknowledgement by the receiving station of the SR character which is then transmitted by the transmitting station 20, the system proceeds through a cycle of operation as described above for initiation of transmission between the two stations. The first block number retransmitted to the receiving station now is one number lower than the "high" block number and this block number should be the same as the number obtained from the block number 35 at the receiving station. If the block number comparison continues to be "high," the reverse channel once again is turned "off" and the transmitting station reverses another two full blocks.

Each two block reversal of the transmitting station results in a net reversal of one block so that the proper block number necessarily must be transmitted within a relatively short number of cycles of operation. In the preferred embodiment of the invention the transmitting station block counter 27 and the receiving station block counter 35 are three-stage cyclic counters; so that if a "high" block number is received by the receiving station, a single reversal of the type referred to above is all that is necessary to bring the block count at the transmitting and receiving stations into synchronization.

It should be noted at this time that the block counter 27 and the block counter 35 may be at any unrelated count when transmission between the transmitting station and receiving station 30 is commenced. The block "low" and block "high" operation which has been described will cause the stations to be brought into block synchronization within a relatively short period of time. Since a "high" block number may be transmitted from the transmitting station 20 to the receiving station 30 just prior to transmission of the first block of information from the transmitting station 20, the first block of information data transmitted by the transmitting station must be preceded by a least one full block of fill data in the record medium, in the event a block "high" condition occurs; so that this block of fill data is the first block retransmitted when the receiving station turns "off" the reverse channel following receipt of the "high" block number.

The first block of information transmitted from the transmitting station also should be a block of fill characters since the block number preceding this first block may be a "low" block number, in which event the recorder 36 at the receiving station is rendered nonresponsive to the block of information following this "low" block number. As a consequence, two full blocks of fill characters or data must precede the information data which the receiving station 30 is to record, with the second of these blocks of fill characters constituting the first block of information transmitted from the transmitting station 20. This modification is all that is necessary in order to establish initial block synchronization between the two stations. Where a synchronizing procedure of this type at the beginning of transmission is undesirable the block counters at the transmitting and receiving stations may be reset to the same arbitrarily selected block number by any suitable automatic means.

In the event that an error occurs during the transmission of a block from the transmitting station 20 to the receiving station 30, it will be detected at the time the comparison of the parity check characters is made in the check character comparison circuit 38. The output of the check character comparison circuit 38, indicating that an error has occurred in the received block, causes the programmer and control circuit 34 to advance to a back-up mode of operation and a signal is supplied to the recorder 36 causing it to reverse the data recorded therein one full block which is the block which was received errored. The reversing mechanism used in the data recorder 36 preferably is of the type disclosed in the copending application of K. Rothlisberger Ser. No. 374,460, filed June 11, 1964. The programmer and control circuit 34 also causes the reverse channel signal supplied through the digital subset 31 to be turned "off" thereby causing the transmitting station to reverse two full blocks following transmission of the block which is in the process of being transmitted by the time the receiver goes into this back-up mode of operation. During the back-up mode of operation which is taking place simultaneously with the reception of the next transmitted block of information, the recorder 36 is rendered nonresponsive to incoming data.

Following completion of the full block back-up of the information record medium in the recorder 36, the programmer and control circuit 34 advances to a delete mode of operation. In this mode of operation, delete characters are supplied through the character recognizer gate 33 to the recorder 36 which is operated in the forward direction to punch delete characters over the errored block of infomation thereby erasing the errored block from the record medium. When the recorder 36 has completed this deletion of the block of information, the programmer and control circuit 34 is advanced to the SR mode of operation, awaiting the reception of SR characters from the transmitting station.

When the check character comparison circuit 36 detects failure of the parity check characters to agree, the block counter 35 is not advanced as it is in the case when the parity check characters do agree. Thus, following the back up and delete mode of operation in the receiving station, the block counter 35 remains set to the count which it had attained at the beginning of the errored block. The first block number then transmitted from the transmitting station 20 to the receiving station 30 following the above error detection sequence should be the same block number to which the counter 35 is set, this being the block number of the block which was errored. If for any reason this block number is either lower or higher than the block number obtained from the block counter 35, the previously described sequence of operation for "low" or "high" block numbers will take place. In any event, block synchronization is maintained throughout transmission and reception of data between the two stations, both for error-free and errored blocks of information. Likewise, if for any reason either of the channels interconnecting the two stations should momentarily be turned "off" or broken due to external causes, the system will automatically operate to provide block resynchronization upon resumption of communication between the stations.

Referring to FIGS. 3 through 9 of the drawings it will be noticed that a number of boxes labeled "FF" appear therein. These boxes represent flip-flop circuits of the type disclosed in FIG. 2 of copending application No. 469,522 filed in the name of H. D. Cook on July 6, 1965. The particular internal circuitry of these flip-flops forms no part of this invention, and reference may be made to application No. 469,522 for details of this operation. However, it should be noted that these flip-flops are all of the type in which the trigger inputs must be gated with a direct current priming potential before the trigger input has any effect on the operation of the flip-flop. For convenience, the two states of the flip-flop are designated "0" and "1." The priming input for the level of the flip-flop is designated on the drawing by the letter P. The priming input which is gated with a particular trigger input is designated in the drawings by placing the same letter A or B at both the trigger and priming inputs of the flip-flop. For example, a trigger input used to set a flip-flop to its "0" state is designated on the drawings as 0B or 0A and this trigger input is gated with a priming input P0B or P0A, respectively. The outputs of the flip-flops are labeled merely "0" or "1" with a positive output potential being obtained from the output to which the flip-flop is set, and a negative potential being obtained from the other output at the same time.

In the ensuing description of the operation of the circuit shown in the figure, the terms "positive" and "negative" potential are used to identify the relative voltages being employed in the circuit. It should be understood, however, that in actual practice such potentials need not be positive and negative but, by way of example, could as well be 0 volts and −6 volts or +6 volts and 0 volts, respectively, depending on the particular circuit components utilized. It is felt, however, that the use of the terms "positive" and "negative" will serve to differentiate the relative potentials used and will facilitate an understanding of the operation of the circuit.

Figure 3:
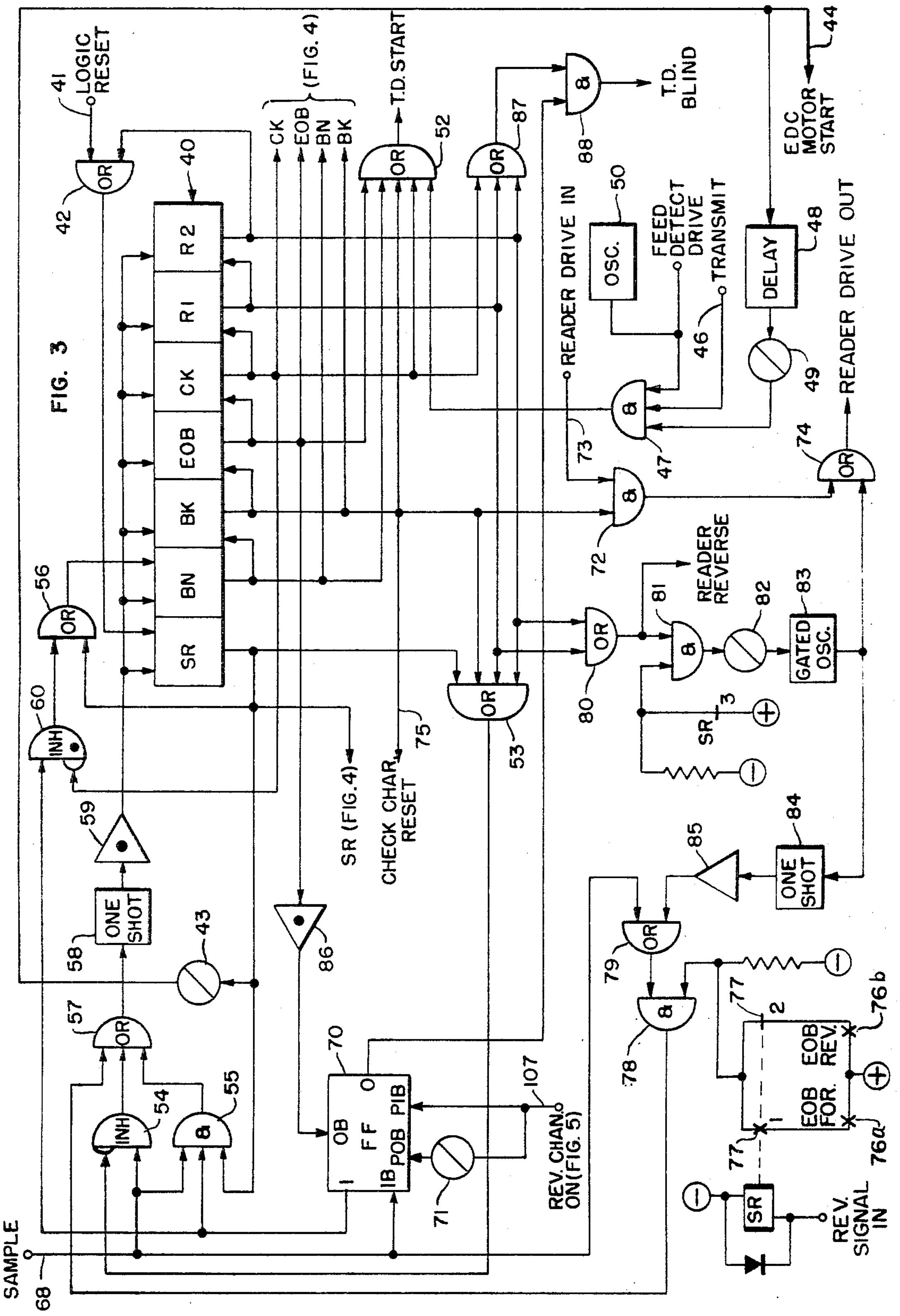
FIGS. 3 to 9 are divided into quadrants for facilitating the location of elements referred to in the specification.
Figure 4:
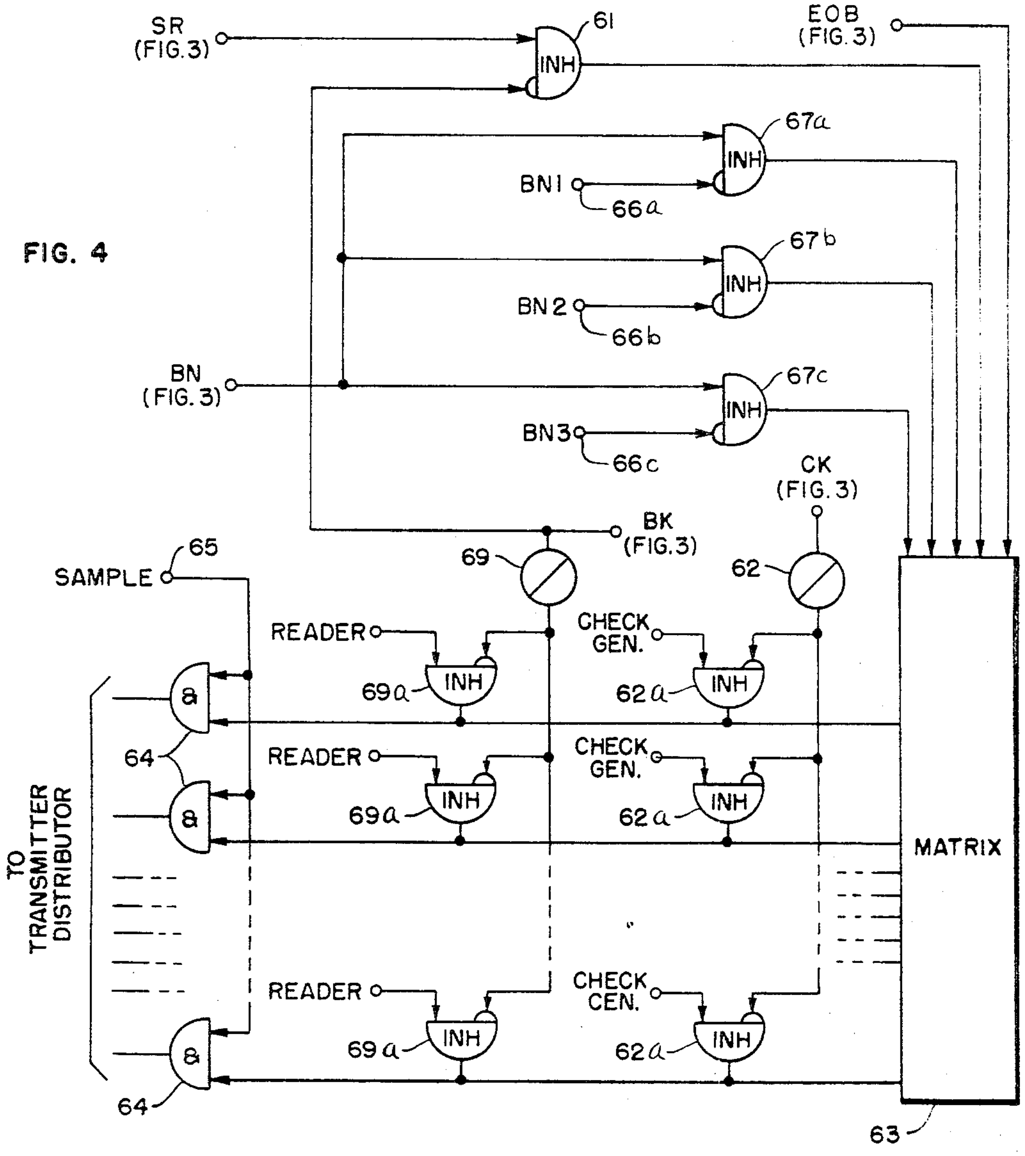
Figure 5:
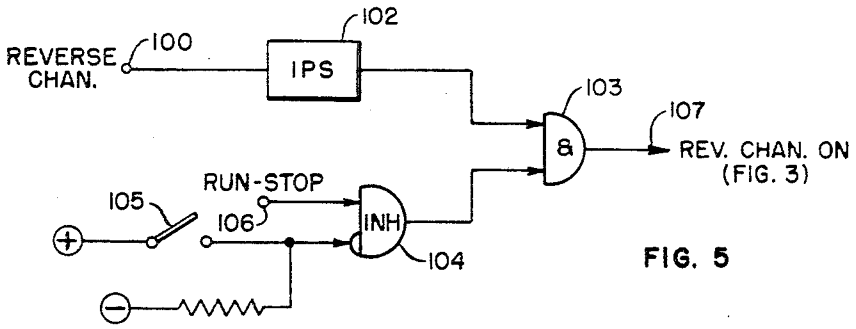

A preferred embodiment of the invention is shown in the detailed circuit diagrams of FIGS. 3 through 9. Although the circuit elements shown in FIGS. 3 and 4 are interconnected to form the transmitter control circuit and the circuit elements of FIGS. 5 through 9 are interconnected to form the receiver control circuit, no attempt has been made to show these circuits in a single circuit diagram covering multiple sheets of the drawings since to do so would result in an unwieldy and difficult to follow circuit diagram. Instead of showing the system in a single circuit diagram, FIGS. 3 through 9 each are directed, insofar as possible, to a portion of the system performing a specific function. Input and output leads on each of these figures which are to be connected to similar leads in other figures of the drawings are given the same reference numeral in both figures with the addition of being identified by showing to which figure or from which figure these leads are interconnected.

In order to facilitate further an understanding of the drawings, reference should be made to FIG. 2 which represents the outline of each of the sheets of the drawings including FIGS. 3 through 10. As indicated in FIG. 2, each of these sheets is to be considered divided into quadrants designated A, B, C, and D, as shown in FIG. 2. In the following detailed description of a preferred embodiment of the invention, the elements found in the respective FIGS. 3 through 10 of the drawings are identified so that each reference numeral first bears a designation indicating the figure of the drawing in which the particular element identified is located. This figure designation then is followed by a designation A, B, C, or D indicating the particular quadrant of the figure in which the element is found; and finally, the particular reference numeral assigned to that element is used. For example, the reverse channel flip-flop shown in FIG. 3 of the drawings is identified as flip-flop 3A–70 indicating that this flip-flop 70 appears in FIG. 3 in quadrant A of the figure.

Transmitting station

The operation of the transmitting station is under control of a programmer consisting of a seven stage ring counter 3B–40. The seven stages of the programmer each correspond to a different mode of operation of the transmitting station, each of these modes determine the type of character to be transmitted from the transmitting station or the type of action required to be taken by the transmitting station. The programmer ring counter 3B–40 advances to each of these modes sequentially in the following order from left to right as shown in FIG. 3: SR mode (sending station ready), BN mode (block number), BK mode (block transmission), EOB mode (end of block), CK mode (check character), R1 mode (reverse block 1), R2 mode (reverse block 2) and back to the original SR mode. This sequence of operation encompasses all of the different modes of operation of the transmitting station, and includes the modes required for error detection and correction operation. In the event that transmission from the transmitting station to the receiving station is not errored, the programmer is advanced directly from the CK mode to the BN mode, skipping the SR, R1 and R2 modes of operation. The manner in which this is accomplished will be described in detail subsequently.

Since the programmer 3B–40 may be in any one of the seven possible modes when the transmitting station initially is turned "on," it is necessary to set the programmer to the SR mode in order that the proper sequence of events necessary for interconnecting the transmitting station and receiving station may be initiated. This is accomplished by the application of a positive pulse to a logic reset input 3B–41 which is applied through an OR gate 3B–42 to set the programmer 3B–40 to its SR state corresponding to the SR mode of operation. A positive output signal then is obtained from the output of the SR stage only and this output signal is supplied through an inverter 3A–43 to a motor start output terminal 3D–44. The negative signal obtained from terminal 3D–44 then is utilized to supply power (in a manner not shown) to the reader 28 (FIG. 1) thereby preparing the sending station for the subsequent transmission of data. It is necessary to supply power to the reader in this manner since the reader normally is supplied with power only upon the establishment of a data communications link between the transmitting terminal and a receiving terminal. At this time such a link has not yet been established.

Once a communications link is established, power is supplied to the reader 28 through a signal obtained from the transmitting station digital subset 21 (FIG. 1) and the subsequent removal of the signal from the control terminal 3D–44 has no adverse effect on the operation of the system. When a communications link between the transmitting station and receiving station has been established and it is desired to transmit data from the transmitting station, a positive signal, from any suitable source such as a push button, is applied to a terminal 3D–46, connected to one of three inputs to an AND gate 3D–47. One of the other inputs of the AND gate 3D–47 is obtained from the output of the SR stage of the programmer 3B–40, this output being delayed by a delay circuit 3D–48 and inverted by an inverter 3D–49 in order to present a delayed positive input signal to the AND gate 3D–47. With these two signals present at the input of the AND gate 3D–47, the gate is enabled and passes positive going pulses obtained from the output of an oscillator 3D–50. These pulses are supplied through an OR gate 3B–52 to the transmitting distributor 25 (FIG. 1) to initiate the storage and transmission from the transmitting distributor 25 of the particular character being supplied to its input at the time each pulse appears.

The positive output signal obtained from the SR stage of the programmer 3B–40 also is passed by an OR gate 3C–53 to the inhibit input of an inhibit gate 3A–54 in order to prevent drive pulses from being applied to the programmer 3B–40 through the gate 3A–54. In addition, the positive signal from the output of the SR stage is applied to an AND gate 3A–55 and through an OR gate 3A–56, the output of which primes the BN stage of the programmer 3B–40; so that the first drive pulse which is applied to the programmer 3B–40 will set the programmer to the BN mode of operation.

At the time that the output pulses are being supplied to the transmitter distributor on the transmitter distributor start lead at the output of the OR gate 3B–52, the positive output signal obtained from the SR stage of the programmer 3B–40 is applied over a lead 3A–SR, 4A–SR to the input of an inhibit gate 4B–61. This positive signal is passed by the inhibit gate 4B–61 since the inhibit input to this gate is a negative signal obtained from the BK output of the programmer 3B–40 over a lead 3B–BK, 4B–BK, due to the fact that only one stage of the programmer 3B–40 can have a positive output at any one time. The output from the inhibit gate 4B–61 is supplied to one input of a control character generating matrix 4BD–63 to cause the output of the matrix to correspond to a control character SR which indicates that the transmitting station is ready to send data. The output of the matrix 4BD–63 is supplied to a plurality of AND gates 4AC–64, one AND gate corresponding to each level or data bit of the character to be transmitted. The other input to each of the AND gates 4AC–64 is a sample input applied to a terminal 4A–65. This sample input is obtained from the transmitter distributor 25 (FIG. 1) once per character and is utilized to transfer the information supplied to the inputs of the AND gates 4AC–64 to the shift register in the transmitting distributor 25 whenever the transmitting distributor is ready to receive the next character for transmission from the transmitting station. The details of the transmitting distributor 25 form no part of this invention and will not be further described herein.

The signals for advancing the programmer are positive going pulses obtained from the transmitting distributor 25 (FIG. 1) once per character and are applied to an input terminal 3A–68. Application of these pulses acts to turn off the stage of the programmer which was on, and the negative-going pulse which appears at the output of the stage turned off turns on the next stage. So long as the system is in the SR mode of operation, however, these sample pulses have no effect on the programmer since they are inhibited from passing through the inhibit gate 3A–54 and since one of the inputs to the AND gate 3A–55 is a negative signal obtained from the output of the reverse channel detection flip-flop 3A–70. This flip-flop 3A–70 initially is set to its "0" state in any suitable manner and remains set to this state during the SR mode of operation, so that the "1" output of the flip-flop is negative at this time. In addition, the sample pulses which pass through an OR gate 3C–79 are blocked by an AND gate 3C–78 because the EOB contacts **3C–76*a* and 3C–76*b* are open, causing a negative potential to be applied to the AND gate 3C–78. Thus, neither the inhibit gate 3A–54 nor either of the AND gates 3A–55 and 3C–78 passes the programmer advance sample pulses applied to the terminal 3A–68** during the SR mode of operation.

SR characters continue to be sent from the transmitting station to the receiving station under control of the output pulses obtained from the output of the OR means 3B–52 until the receiving station acknowledges receipt of an SR character. This is accomplished by turning "on" the previously turned "off" reverse channel signal supplied from the receiving station to the transmitting station. When this occurs, the transmitting station digital subset 21 (FIG. 1) supplies a positive signal to the reverse channel input terminal 5C–100. This positive signal is passed by a delay circuit 5CD–102 in the form of an integrating pulse shaper so that spurious noise bursts are ignored. The output of the delay circuit 5CD–102 is a positive signal which is applied to the AND gate 5D–103, the other input of which is a positive signal obtained from the output of an inhibit gate 5D–104. The inhibit input to the inhibit gate 5D–104 is a negative signal at this time provided that there is tape in the reader 28 (FIG. 1) which causes a tape-out switch 5D–105 to be opened. When transmission is to be initiated from the transmitting station, the positive transmit signal which is applied to the terminal 3D–46 also is applied to the input terminal 5D–106 to the inhibit gate 5D–104.

Thus, as soon as the reverse channel is turned on by the receiving station, a positive output signal is obtained from the output of the AND gate 5D–103 and is applied over the lead 5D—107, 3C–107 to cause a positive priming potential to be supplied to the P1B input of the flip-flop 3A–70. At the same time a negative priming potential is applied to the P0B input of the flip-flop 3A–70 through an inverter 3AC–71. The next sample pulse that appears on the terminal 3A–68 is applied to the 1B trigger input of the reverse channel flip-flop 3A–70 causing it to be set to its "1" state since the P1B priming input of the flip-flop 3A–70 has a positive potential applied to it at this time. When this occurs, the second input to the AND gate 3A–55 obtained from the "1" output of the flip-flop 3A–70 rises from a negative to a positive potential thereby enabling the AND gate 3A–55. The next subsequent pulse applied to the terminal 3A–68 then is passed by the AND gate 3A–55 through on OR gate 3A–57 to trigger a one-shot multivibrator 3A–58, the output pulse from which is supplied to a pulse amplifier 3A–59, the output of which in turn is the advance pulse for the programmer 3B–40. Since the stage corresponding to mode BN is primed at the time this first advance pulse is applied to the programmer 3B–40, the programmer advances from the SR to the BN mode of operation causing the output of the BN stage to be a positive potential and the outputs from all of the other stages to be at a negative potential.

When the SR stage of the programmer 3AB–40 drops to a negative potential the AND gate 3A–55 is prevented from being responsive to any future sample pulses. At the same time the output from the OR gate 3C–53 drops to a negative value thereby enabling the inhibit gate 3A–54. It should be noted that when the programmer advances out of the SR mode of operation, the output of the inverter 3D–49 drops to a negative value thereby preventing the passage of any pulses from the output of the oscillator 3D–50 through the AND gate 3D–47. This portion of the circuit is only effective for controlling the transmitter distributor 25 (FIG. 1) during the SR mode of operation.

When the programmer 3B–40 advances to the BN mode of operation, a positive signal is applied through the OR gate 3B–52 to operate as a next transmitter distributor start signal causing the transmitter distributor 25 to continue operation. Thus, after sending the SR character that is still in the shift register of the transmitting distributor 25, at the time the return channel was turned "on," the distributor is reset immediately and inserts the next character. This next character is one of the three possible BN (block number) characters.

The first block number transmitted is whatever block number is obtained from the output of the reversible block counter 27 (FIG. 1) at this time. It may be any one of the three possible block numbers and it does not matter which one of the three numbers is transmitted. The block counter 27 may be of any suitable type, such as an electronic counter advancing one count every time a predetermined number of characters equal to the number in a block has been read by the reader 28, or the counter may be a mechanical cam operated counter driven by the record feed mechanism of the reader. Since counters of both types are old and well known in the art and constitute no part of this invention, no detailed description of the block counter will be given.

The counts corresponding to the block numbers 1, 2 and 3 are applied to input terminals **4A–66*a*, 4A–66*b*, 4A–66*c*, respectively. The terminal corresponding to the desired block count has a negative signal applied to it at this time and the other two terminals have positive signals applied to them. Associated with each of these block number input terminals is an inhibit gate 4B–67*a*, 4B–67*b* and 4B–67*c*, respectively, with the block number input signal being applied to the inhibit input of its corresponding inhibit gate. Thus, two of the inhibit gates 4B–67*a* through 4B–67*c* will be inhibited whereas the third inhibit gate will be enabled at any given time. The positive signal obtained from the output of the BN mode of the programmer 3B–40 is applied over a lead 3B–BN, 4A–BN to the inputs of all three inhibit gates 4B–67*a* through 4B–67*c*. The inhibit gate corresponding to the block number obtained from the output of the block counter 27 (FIG. 1) passes this positive signal to the control character generator matrix 4BD–63, the output of which is a permutation encoded character corresponding to the desired block number. This output is supplied to the AND gates 4AC–64, from which it is supplied to the transmitting distributor 25** (FIG. 1) in the same manner as the SR character, previously described.

The sample pulse that is applied on terminal 4A–65 to set the block number character into the transmitting distributor register occurs simultaneously with the application of a sample pulse on terminal 3A–68. This pulse is passed by the inhibit gate 3A–54 and the OR gate 3A–57 to trigger the one-shot multivibrator 3A–58. A predetermined period of time later, the next programmer advance pulse is obtained from the output of the pulse amplifier 3A–59 to advance the programmer to the next mode which is the BK mode of operation, causing the BK stage to have a positive output and the remaining stages of the programmer 3B–40 to have negative outputs. The one-shot multivibrator 3A–58 is provided to cause a short delay in the operation of the programmer advance, so that changes from one state in the programmer to the next state do not occur during other operating events in the system. The time-out period of the multivibrator 3A–58 is preferrably 100 to 200 microseconds. During the time that the one-shot multivibrator 3A–58 is timing out, the block number (BN) character is being transmitted by the transmitter distributor.

When the programmer 3B–40 shifts out of the BN mode of operation to the BK mode, a positive potential continues to be applied to the input of the OR gate 3B–52 allowing the transmitter distributor to continue to transmit whatever characters are presented to its input from the outputs of the AND gates 4AC–64. The positive signal obtained from the BK stage of the programmer 3B–40 also is applied through the OR gate 3C–53 to the inhibit input of the inhibit gate 3A–54 thereby preventing the passage of any pulses through that gate. It should be noted at this time that the AND gate 3A–55 also is disabled since a negative potential is applied to its input from the output of the SR stage of the programmer 3AB–40. Thus, no subsequent sample pulses will be passed by either of the gates 3A–54 or 3A–55 so long as the programmer 3B–40 is in the BK mode of operation.

The positive potential obtained from the output of the BK stage of the programmer 3B–40 is applied to an AND gate 3D–72 thereby enabling that AND gate to pass reader drive pulses which are applied to its input. These reader drive pulses are derived from the operation of the transmitter distributor once per character in order to step the reader so that it presents successive characters in proper timed relationship with the application of sample pulses on the terminal 4A–65 for transferring the character being read to the transmitter distributor. When the programmer 3B–40 is in any mode of operation other than the BK mode of operation, the AND gate 3D–72 has a negative potential applied to its input thereby blocking the passage of these reader drive pulses.

The positive output from the BK stage also is applied to a lead 3A–75 to reset the check character generator 29 (FIG. 1) to its "0" or empty state. The BK signal also is applied over the lead 3B–BK, 4B–BK to the inhibit input of the inhibit gate 4B–61 to prevent the passage of any signals by that inhibit gate. The signal appearing on lead 3B–BK, 4B–BK also is inverted by an inverter 4B–69, the output of which is a negative potential which is applied to the inhibit input of a plurality of inhibit gates **4AC–69*a* thereby enabling those inhibit gates. The other inputs to the inhibit gates 4AC–69*a* are obtained from the various code levels the reader and the permutation coded characters read by the reader are passed through the inhibit gates 4AC–69*a* to the inputs of the AND gates 4AC–64**, from which they are supplied to the transmitter distributor in the manner previously described.

Since the output from the BN stage of the programmer 3AB–40 is a negative signal at this time, no signal output is obtained from any of the inhibit gates **4B–67*a* through 4B–67*c*. In the same manner since the EOB stage and the CK stage of the programmer 4AB–40 both are negative at this time, negative signals are applied over the leads 3B–EOB, 4B–EOB and 3B–CK, 4B–CK so that none of the inputs to the control character generator matrix 4BD–63 are positive during the BK mode of operation. As a consequence, no output is obtained from the matrix 4BD–63. The negative signal applied to the lead 3B–CK, 4B–CK is inverted by an inverter 4B–62 causing a positive signal to be applied to the inhibit inputs of a plurality of inhibit gates 4BD–62*a*, the other inputs of which are obtained from the various levels of the check character generator 29** (FIG. 1).

Thus, when the system is in the BK mode of operation, the only signals which are supplied to the AND gates 4AC–64 are the permutation encoded characters obtained from the output of the reader. Since the reader drive pulses are allowed to pass through the AND gate 3D–72 and the OR gate 3D–74, the inputs to the AND gates 4AC–64 change once per character to correspond to the character being read by the reader. Each of these characters then is supplied by the transmitting distributor to the digital subset 21 (FIG. 1) at the transmitting station and constitutes a data information character in the block being transmitted. Transmission in this mode of operation takes place until a number of characters equal to the number of characters in a block has been transmitted from the transmitting station.

It should be noted that the first reader drive pulse obtained from the output of the OR gate 4D–74 is the one generated at the end of the transmission of the BN character. Since it takes a finite time for the reader to step the tape to the next character, the first character in the tape is inserted into the transmitting distributor through the AND gate 4AC–64 before the reader steps the tape. During the time that this first character is being transmitted from the transmitting distributor, the second character in the reader is moved into position; and the outputs of the inhibit gates **4AC–69*a* correspond to this second character. At the end of transmitting the first character, the next reader drive pulse is generated and is passed by the gates 3D–72 and 3D–74** to step the tape in the reader from the second character to the third character. Before the tape is moved, however, the second character from the reader is set into the shift register of the transmitter distributor. The reader then advances the third character in the tape to the read position. This sequence is followed so long as the programmer is in the BK mode of operation.

Preferably the sending station transmits characters in blocks of 80 when it is operating as an error detection and correction system. When 80 characters have been transmitted, a normally open end-of-block contact **3C–76*a* is closed causing positive potential to be applied to one input of an AND gate 3C–78 through the now closed make contact of a pair of transfer contacts 3C–77. The make contact 3C–77 remains closed so long as a positive or "on" reverse signal is supplied to the transmitting station from the receiving station causing a relay 3C–SR to be operated. When the next sample pulse is applied from the transmitting distributor to the terminal 3A–68, it is passed by an OR gate 3C–79 and the now enabled AND gate 3C–78 to the OR gate 3A–57 to trigger the one-shot multivibrator 3A–58**, causing the programmer to be advanced out of the BK mode of operation into the EOB mode of operation in which the EOB stage has a positive output and the remaining stages have a negative output.

In the preferred embodiment of the invention, the EOB contact **3C–76*a* is closed at the time the 80th character of the block is placed over the reading position in the reader due to the drive pulses generated at the end of transmission of the 78th character. This same sample pulse which triggers the one-shot multivibrator 3A–58 also is applied to the input terminal 4A–65** to cause the 80th character to be supplied to the transmitter distributor shift register. During the transmission of the 80th character by the transmitter distributor the drive pulse which was obtained from the 79th character causes the reader to move the 80th character off the reading position and to position the first character of the next block over the reading position. This also causes the forward EOB contact 3C–76 to open.

The programmer 3B–40 advances out of the BK mode and into the EOB mode prior to the time of occurrence of the reader drive pulse generated by the distributor at the end of the transmission of the 80th character. As a consequence, the input to the AND gate 3D–72 obtained from the output of the stage BK of the programmer 3AC–40 drops to a negative value before the occurrence of this 80th character reader drive pulse on the terminal 3D–73 thereby preventing the drive pulse from passing through the AND gate 3D–72 to step the reader. The reader thus is stopped with the first character of the next block in the reading position.

The transmitter distributor start lead remains at a positive potential obtained from the output of the OR gate 3B–52 since the output of the EOB stage connected to the input of the OR gate 3B–52 is positive at this time. This positive output also is applied over lead 3B–EOB, 4B–EOB to the input of the control character generator matrix 4BD–63 causing a control character corresponding to this end of block mode of operation to be supplied to the inputs of the AND gates 4AC–64. No other input signals are presented to the AND gates 4AC–64 at this time. Thus, the next sample pulse applied to the terminal 4A–65 causes an end of block (EOB) character to be supplied to the transmitter distributor for transmission.

When the BK stage of the programmer 3B–40 drops to a negative potential at the time the programmer advances to an EOB mode, all of the inputs to the OR gate 3C–53 are at a negative potential thereby removing the inhibit signal from the inhibit gate 3A–54. Thus, the next sample pulse following the one which advances the programmer 3B–40 from the BK to the EOB mode of operation advances the programmer from the EOB to the CK mode of operation. At this time, the output of the check character generator 29 (FIG. 1) corresponds to the parity check character for the block of characters transmitted just preceding the EOB character. When the programmer 3B–40 is in the CK mode of operation, a positive signal continues to be applied from the OR gate 52 to the transmitter start lead thereby allowing the transmitter distributor to continue operation, provided the reverse channel is "on" at this time.

The output of the CK stage of the programmer 3B–40 also is applied over the lead 3B–CK, 4B–CK where it is inverted by inverter 4B–62, the output of which is a negative signal thereby enabling the inhibit gates 4BD–62*a*. The other inputs to the inhibit gates constitute the permutation encoded parity check character obtained from the check character generator 29 (FIG. 1), and the outputs of these inhibit gates 4AD–62*a* are supplied to the AND gates 4AC–64 from which the check character is supplied to the transmitter distributor in the manner previously described. The inhibit gates 4AC–69*a* and the control character matrix 4AD–63 are inhibited from supplying any information to the AND gates 4AC–64 during the CK mode of operation.

At the time the programmer is advanced from the EOB to the CK mode of operation, a negative going pulse is obtained from the output of the EOB stage and is applied to the input of pulse amplifier 3A–86. The output of the pulse amplifier 3A–86 is a positive pulse which is applied to the 0B trigger input of the reverse channel flip-flop 3A–70. If the reverse channel is "on" at the time of arrival of this trigger pulse, the P0B of the flip-flop has a negative potential applied to it and the P1B priming input of flip-flop has a positive potential applied to it, so that the trigger pulse applied to the 0B trigger input has no effect on the flip-flop. Thus, if the reverse channel is "on" when the programmer 3AB–40 is advanced from the EOB to the CK stage of operation, the reverse channel flip-flop remains set to its "1" state so that a negative potential is obtained from the "0" output of the flip-flop.

In the event, however, that the reverse channel is "off" at the time the programmer is advanced from the EOB to the CK stage of operation, a positive priming potential is applied to the P0B priming input of the flip-flop 3A–70 when the trigger pulse is applied to the 0B trigger input of the flip-flop from the output of the pulse amplifier 3A–86. In this event, the flip-flop 3A–70 is set to its "0" state, causing a positive potential to be obtained from the "0" output of the flip-flop. This potential is applied to one input of an AND gate 3D–88, the other input to which is obtained from the output of an OR gate 3D–87 the inputs to which are obtained from the CK, R1 and R2 of the stages of the programmer 3AB–40.

When the programmer is advanced to the CK mode of operation following detection of a reverse channel "off" by the flip-flop 3A–70, a positive potential is applied through the OR gate 3D–87 to the AND gate 3D–88 from the output of the CK stage of the programmer 3AB–40. This causes a positive potential to be obtained from the output of the AND gate 3D–88, and this potential is applied to the transmitting distribuor 25 (FIG. 1) to cause the distributor to be rendered nonresponsive to input signals applied to it. When this occurs, the distributor does not supply the parity check character to the digital subset at the transmitting station and no parity check character is transmitted. In effect, this causes an error to be forced in the block which was just transmitted since the failure to transmit the parity check will be detected at the receiving station when a comparison between the parity check character generated at the receiving station is made with the incoming signal which corresponds to the transmitted parity chack character.

This forcing of an error in the block being transmitted at the time the reverse channel is detected "off" is done in order to insure that the receiving station deletes that block of information from the record medium since the transmitting station will retransmit the block. It is possible that the reverse channel "off" condition could have been caused by a reverse line break rather than the detection of an error in the receiving station, and the receiving station would record this block of information as a valid block if the parity check character were transmitted by the transmitting station. By forcing an error in the block, the transmitting station insures that the receiving station will record the block only once, and this recording will be done during the rerun of that block by the transmitting station.

The programmer advances out of the CK mode when the next advance pulse is applied to the input terminal 3A–68. This programmer advance pulse is passed by the inhibit gate 3A–54 causing the one-shot multivibrator 3A–58 to be triggered in the manner described previously. At the end of the time period of the one-shot multivibrator 3A–58, the programmer 3B–40 is advanced out of the CK mode of operation. If additional check characters are desired to be transmitted in the system, an additional CK stage for each additional character may be provided in the programmer 3B–40 along with additional inhibit gates and check character generating facilities. After the CK mode of operation, the particular mode to which the programmer now advances depends upon whether or not the reverse channel was detected as "on" or "off."

If the reverse channel was detected "on," the "1" output of the flip-flop 3A–70 is a positive potential which is applied to the input of an inhibit gate 3A–60. This inhibit gate is of the type which has an AC coupled inhibit input so that it can only provide an output pulse when a negative transition is applied to the inhibit input and the other input is positive. When the programmer 3AB–40 is stepped out of the CK mode of operation, the inhibit input of the inhibit gate 3A–60 drops from a positive value to a negative value thereby enabling the gate. A positive output signal then is obtained from the output of the inhibit gate 3A–60 and is passed by the OR gate 3A–56 to prime the BN stage of the programmer 3B–40 to turn "on" upon the application of the advance pulse to the programmer. Thus, when the advance pulse for the programmer 3AB–40 is obtained from the output of the pulse amplifier 3A–59, it attempts to drive the programmer 3B–40 from the CK stage of operation to the R1 stage. This does not occur, however, because the negative pulse then obtained from the output of the OR gate 3A–56 and applied to the input of the BN stage of the counter is of longer duration than the pulse applied to the R1 stage of the counter; and the BN stage of the counter is turned "on" thereby resetting the programmer to the BN mode of operation. Once it is in the BN mode of operation, the programmer 3B–40 advances through its normal sequence in the same manner as described previously. It should be noted, however, that since a full block of information has been transmitted from the reader since the programmer was last in its BN mode of operation, the block number supplied to the block number inputs 4A–66*a* and 4A–66*c* is advanced by one count.

If the reverse channel is detected as being "off" during the EOB and CK modes of operation of the programmer 3B–40, the reverse channel flip-flop 3A–70 is set to its "0" state causing a positive potential to be obtained from its "0" output and a negative potential to be obtained from its "1" output. Thus, a negative potential is applied to the input of the inhibit gate 3A–60 thereby preventing any positive potential from being obtained from the inhibit gate 3A–60 and OR gate 3A–56, so that the BN stage of the programmer 3B–40 is not primed at the time the advance pulse is obtained from the output of the pulse amplifier 3A–59. As a consequence, the programmer 3B–40 is advanced to the R1 stage, placing the transmitting station in the R1 mode of operation. In the R1 mode of operation, a positive potential is applied once again through the OR gate 3C–53 thereby blocking the passage of any sample pulse by the inhibit gate 3A–54. A positive potential continues to be applied through the OR gate 3D–87 to the transmitter-distributor blind AND gate 3D–88 so long as the system remains in this mode of operation.

In the R1 mode, a positive pulse also is applied through an OR gate 3C–80 to a "reader reverse" control lead to cause subsequent stepping of the reader to be in the reverse direction so long as a positive signal remains at the output of the OR gate 3C–80. When the reverse channel is "off," the relay 3C–SR is released thereby causing the make contact 3C–77 to open and the break contact 3C–77 to close. The contact 3C–SR–3 also is closed at this time causing a positive potential to be applied to one input of an AND gate 3C–81, the other input of which is the positive potential obtained from the output of the OR gate 3C–80. This causes a positive potential to be supplied from the AND gate 3C–81 through an inverter 3C–82 to a gated oscillator 3C–83, enabling operation of the oscillator, which may be of any suitable type, such as an oscillator of the type shown in Patent No. 3,210,686, issued Oct. 5, 1965 to C. J. Rocca. The output pulses obtained from the gated oscillator 3C–83 then are applied through the OR gate 3D–74 to step the reader once for each pulse obtained from the output of the oscillator. It is necessary to supply the drive pulses for driving the reader in the reverse direction from the gated oscillator 3C–83 since the transmitter distributor is rendered inoperative at this time due to the positive output signal obtained from the output of the transmitter disributor blind AND gate 3D–88.

The output pulses obtained from the gated oscillator 3C–83 also trigger a one-shot multivibrator 3C–84 which supplies pulses through a pulse amplifier 3C–85 to the OR gate 3C–79, the output of which is applied to one input of the AND gate 3C–78. During the first through the 79th drive pulses obtained from the gated oscillator 3C–83 no output pulse is obtained from the AND gate 3C–78 since the EOB reverse contact 3C–76*b* is open and the make transfer contact 3C–77 also is open. When the reader completes the 79th step in the reverse direction, the reverse EOB contact 3C–76*b* is closed. The next or 80th drive pulse obtained from the output of the gated oscillator 3*c*–83 drives the one-shot multivibrator 3C–84, which in turn causes a positive output pulse to be obtained from the output of the OR gate 3C–79 a short time later. This pulse then is passed by the AND gate 3C–78 since the EOB contact 3C–76*b* is closed, causing a positive potential to be applied to the other input of the AND gate 3C–78. A short time thereafter, the reader steps again causing the EOB contact 3C–76*b* to be opened, thereby blocking the passage of any additional pulses by the AND gate 3C–78. The pulse passed at the 80th step by the AND gate 3C–78 is passed by the OR gate 3A–57 to drive the one-shot multivibrator 3A–58 causing the programmer 3B–40 to be advanced from the R1 to the R2 mode of operation.

The conditions which existed to cause the reverse stepping of the reader in the R1 mode of operation remain the same in the R2 mode of operation. The transmitter distributor continues to be rendered nonresponsive by means of a positive signal applied to it through the OR gate 3D–87 and AND gate 3D–88, and the OR gate 3C–80 has a positive output signal applied to it thereby enabling the AND gate 3C–81. The drive pulses obtained from the output of the gated oscillator 3C–83 continue to step the reader in the reverse direction. At the end of the 79th step in the R2 mode of operation, the EOB contact 3C–76*b* once again closes thereby causing a programmer advance pulse to be obtained from the output of the AND gate 3C–78 in the manner described in conjunction with the R1 mode of operation. The programmer then is reset from the R2 mode of operation to the SR mode of operation since the output of the R2 stage of the programmer 3AB–40 is applied through the OR gate 3B–42 to the input of the SR stage at the time the advance pulse is obtained from the output of the pulse amplifier 3A–59.

When the output of the R2 stage of the programmer 3AB–40 drops to a negative potential, the output of the OR gate 3C–80 drops to a negative potential thereby causing a negative potential to be obtained from the output of the AND gate 3C–81. This output is inverted by the inverter 3C–82 and causes operation of the gated oscillator 3C–83 to cease. Thus, no further reader drive pulses are obtained from the output of the OR gate 3D–74. When the output of the OR gate 3C–80 drops to a negative potential the reader reverse signal also is removed, and the reader reverts to its forward mode of operation to allow subsequent reader drive pulses obtained from the output of the OR gate 3D–74 to drive the reader in the forward direction.

Once the programmer 3B–40 returns to the SR mode, the system operates in the same manner as described previously for initiation of transmission from the transmitting station. The programmer then advances from the SR mode to the BN mode and on through the CK mode in the manner described previously. If the reverse channel remains "on" during the EOB and CK modes of operation, the programmer 3B–40 will reset from the CK to the BN mode of operation and continue transmission. If the reverse channel is turned "off," the programmer 3B–40 will advance through the R1 and R2 and SR modes of operation following the CK mode of operation.

Receiving station

Figure 6:
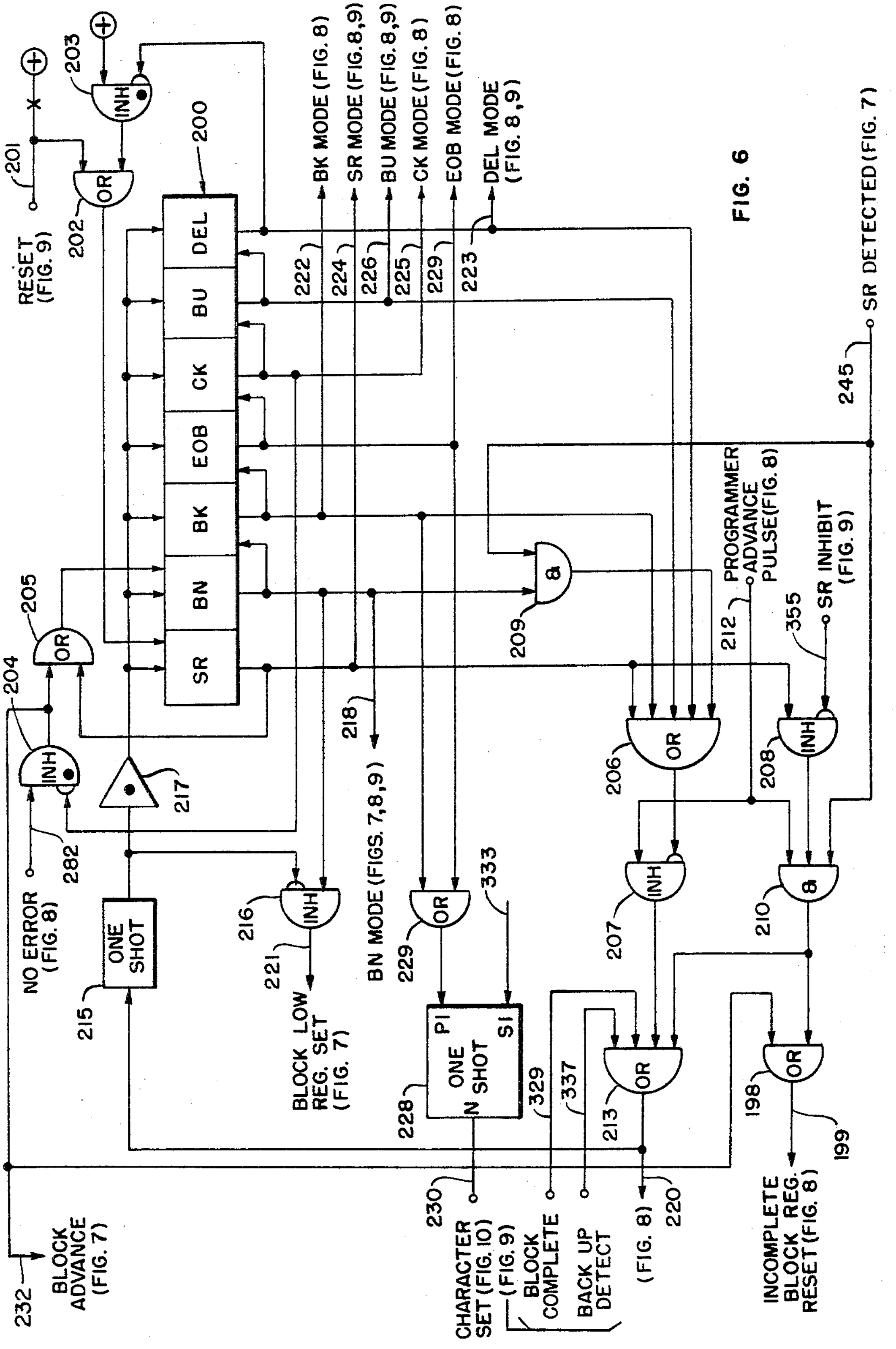

The receiving station control circuit is shown in FIGS. 6 through 10. Referring now to FIG. 6, the operation of the receiving station is under control of a seven stage programmer 6B–200 similar to the programmer 3B–40 used in the transmitting station. The seven stages of the receiving station programmer each correspond to a different mode of operation of the receiving station, these modes in turn corresponding to similar modes of operation in the transmitting station. The programmer ring counter 6B–200 advances to each of these modes sequentially in the following order from left to right as shown in FIG. 6: SR mode receiving station in condition for reception of SR characters), BN mode (block number), BK mode, block reception), EOB mode (end of block), CK mode (check character comparison), BU mode (backup perforator, DEL mode (delete information in perforator) and back to the original SR mode. This sequence of operation encompasses all of the different modes of operation of the receiving station, including the modes required for operation in the event that an error occurs in the information received by the receiving station. In the event that the reception of information from the transmitting station by the receiving station is not errored, the programmer is advanced directly from the CK mode of operation to the BN mode of operation, skipping the BU, DEL and SR modes. The manner in which this is accomplished will be described in detail subsequently.

Since the receiving station programmer 6B–200 may be set to any one of the seven possible modes of operation or states when the receiving station initially is turned "on," it is necessary to set the programmer to the SR mode in order that the proper sequence of events necessary for reception of information from the transmitting station may be initiated. This is accomplished by the momentary closure of a switch connected between a source of positive potential and a logic reset input terminal 6B–201. The pulse obtained then is applied through an OR gate 6B–202 to the SR stage of the programmer 6B–200 to set the programmer to the SR mode of operation on the negative-going transition which occurs at the end of the reset pulse.

A second input to the OR gate 6B–202 is obtained from the output of an inhibit gate 6B–203. This output is a negative potential at this time, since the inhibit input of the gate 6B–203 is AC coupled to the gate thereby enabling the gate only when a negative signal transition is applied to the inhibit input. Thus, for steady state signals applied to the inhibit input of the inhibit gate 6B–203, the output of the gate remains negative irrespective of whether the steady state signal applied to the inhibit gate is positive or negative. Consequently, the inhibit gate 6B–203 has no affect on the OR gate 6B–202 during initial start-up of the receiving station.

When the programmer 6B–200 is set to the SR mode of operation, a positive output signal is obtained from the output of the SR stage; and this output signal is applied through an OR gate 6C–206 to the inhibit input of the inhibit gate 6C–207 thereby inhibiting the passage of any input pulses applied to the other input of the inhibit gate 6C–207. At the same time, the positive output signal obtained from the output of the SR stage of the programmer 6B–200 is applied to the signal input of another inhibit gate 6C–208. The positive output pulse obtained from the SR stage of the programmer also is applied over a lead 6B–224, 8D-224 through an OR gate 8D–295 and a fan-out gate 8D–296 to the "0" output of an incomplete block register flip-flop 8D–304 to set the flip-flop to its "0" state. The output of the fan-out gate 8D–296 also is supplied over a lead 8D–298, 9C–298 to the "0" output of a reverse channel control flip-flop 9C–310 to set that flip-flop to its "0" state. All of the other stages of the programmer 6B–200 have a negative output signal at this time, and the receiving station is in condition for recognition of the transmission of SR characters to it from the transmitting station, indicating that the transmitting station is ready to transmit data to the receiving station.

Figure 7:
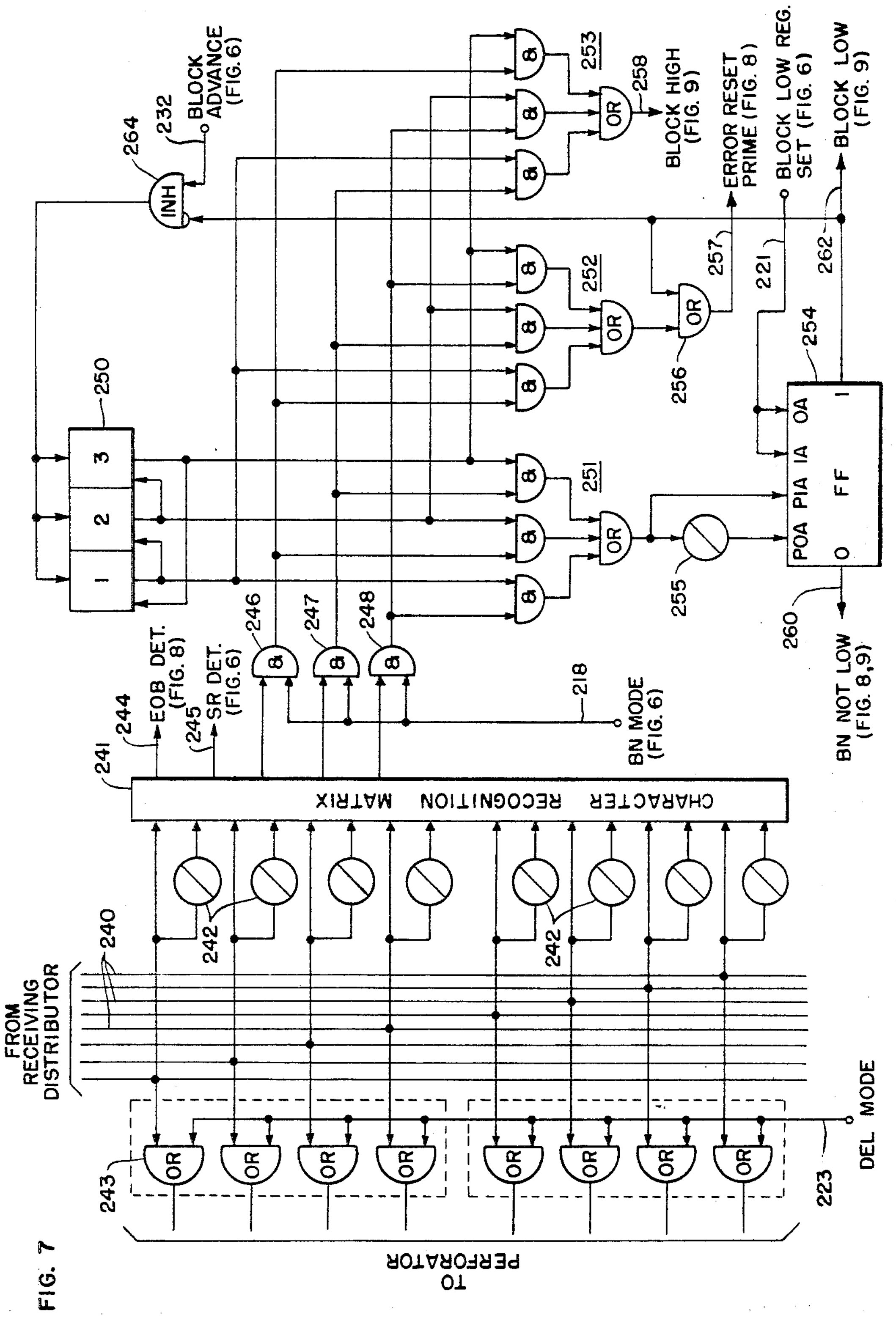
Figure 8:
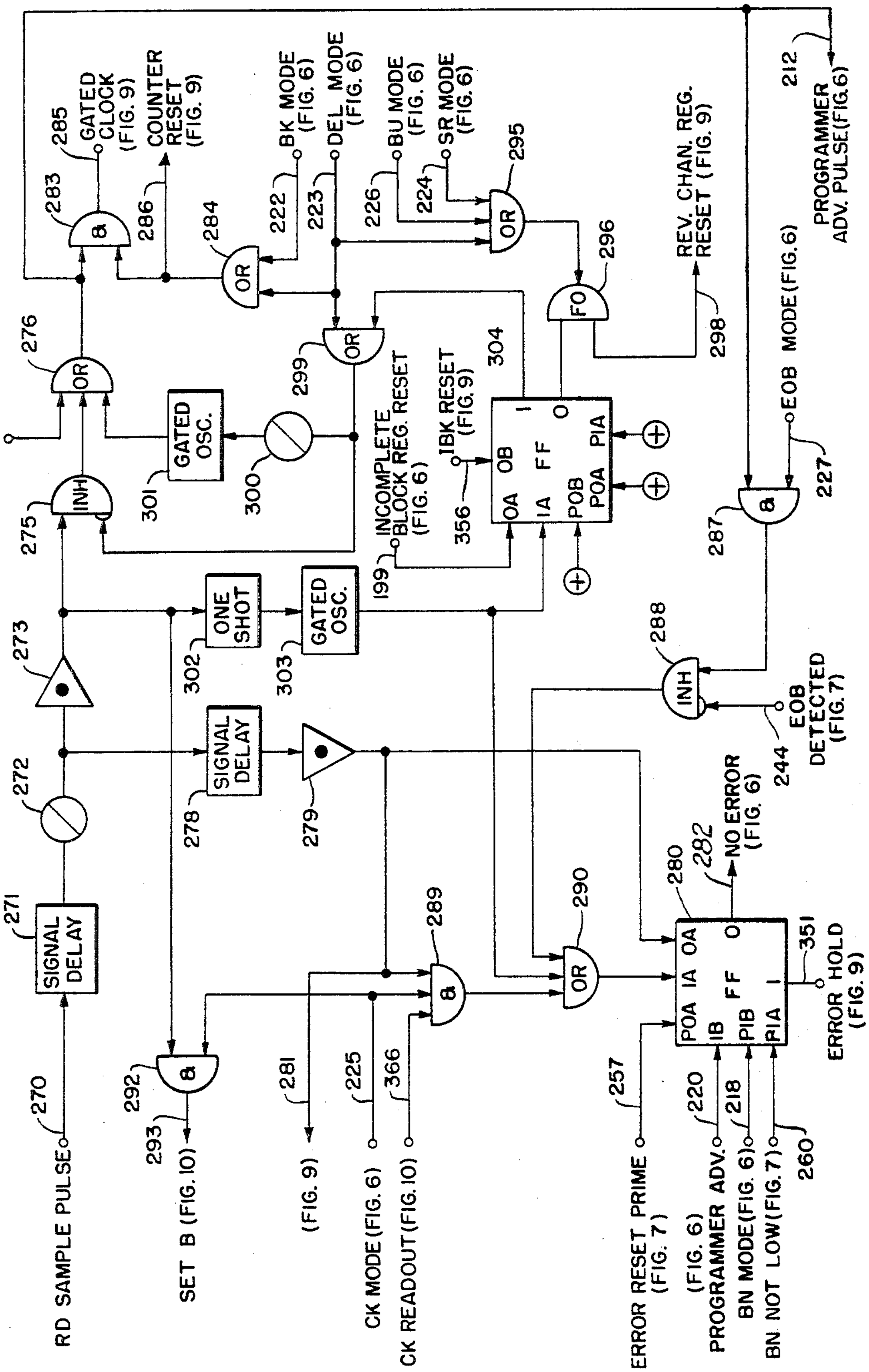
Figure 9:
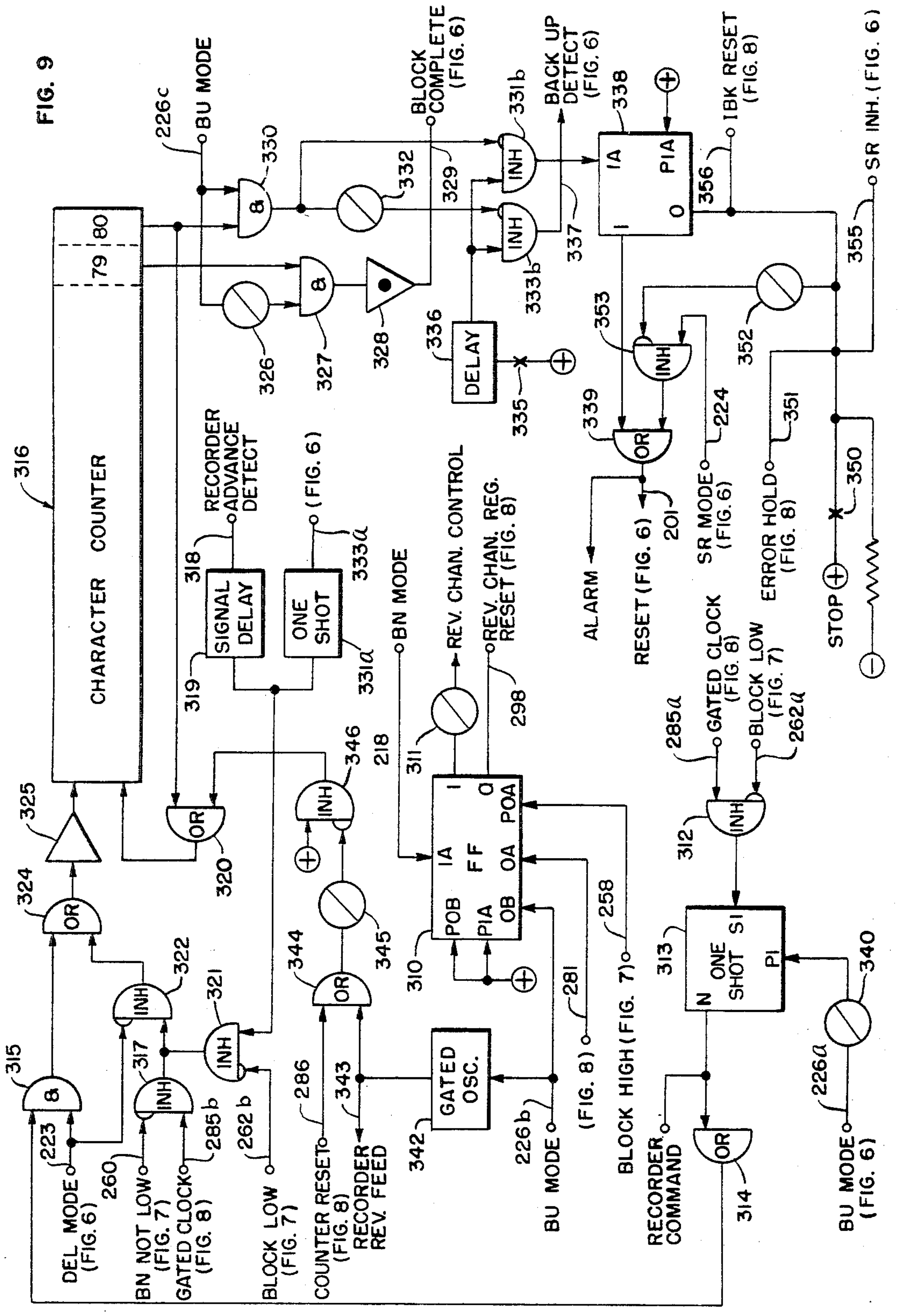
Figure 10:
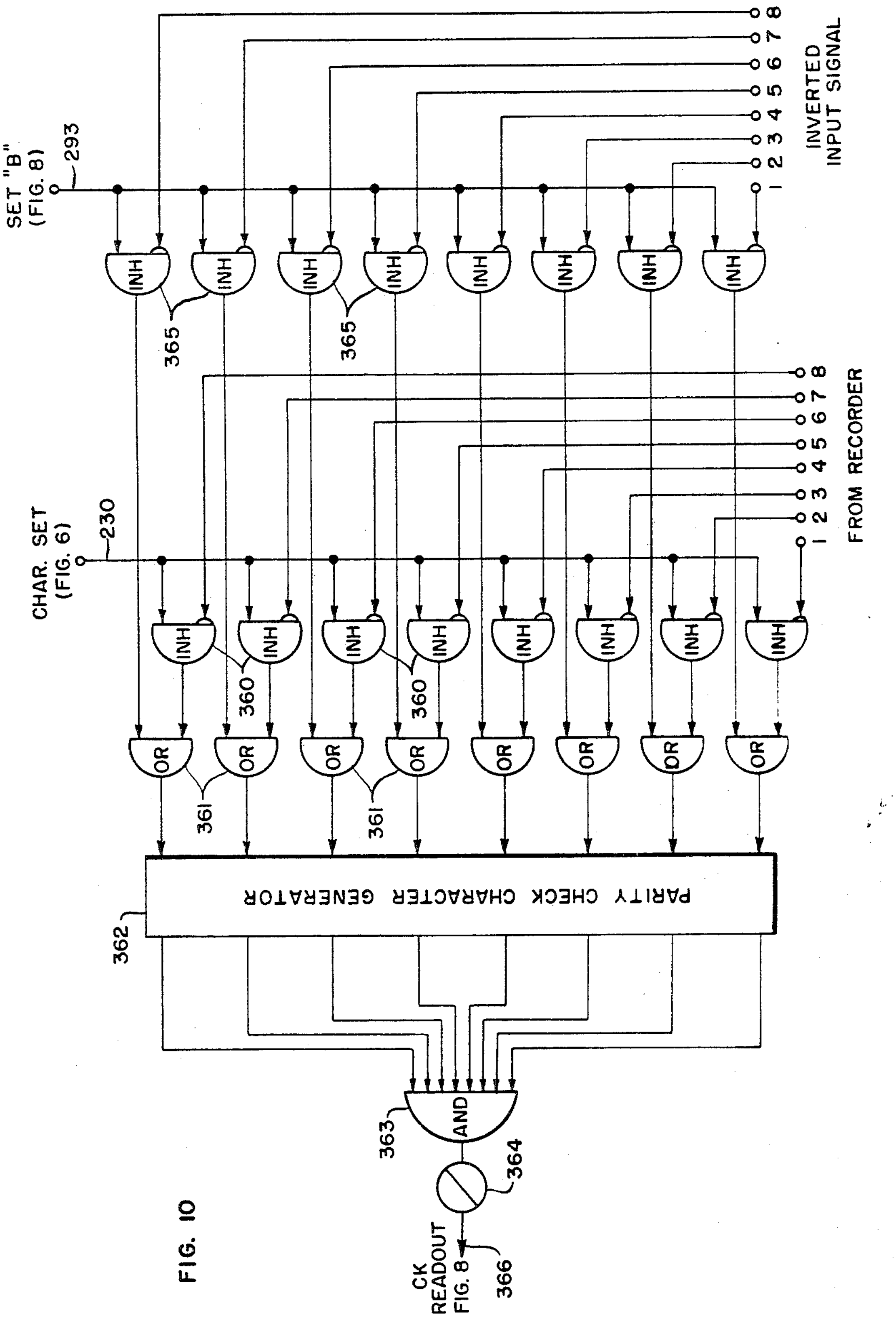

Referring now to FIG. 7, the data received by the receiving station from the transmitting station passes through a receiving distributor of a suitable type such as the receiving distributor indicated generally as receiving distributor 32 in FIG. 1. The output of the receiving distributor in the form of parallel permutation coded characters is supplied over a plurality of leads 7A–240 directly and through a plurality of inverters 7AC–242 to a character recognition matrix 7AC–241. The output of the receiving distributor applied over leads 7A–240 also is supplied to a plurality of OR gates 7AC–243, each OR gate being connected to a different one of the leads 7A–240 so that the OR gates 7AC–243 correspond to the permutation coded characters which are received. The outputs of these OR gates 7AC–243 are supplied to the input of the receiving station recorder 36 (FIG. 1) which preferably is a reperforator of the type disclosed in the afore-mentioned Zenner patent. So long as the receiving station is in the SR mode of operation, however, the reperforator is rendered insensitive to any input signals obtained from the outputs of the OR gates 7AC–243 as will be more fully described subsequently.

The character recognition matrix 7AC–241 is a conventional diode matrix containing five AND gates arranged to detect five of the possible characters which may be transmitted in permutation code to the receiving station. These five characters are the five control characters which were described in conjunction with the operation of the transmitting station. These characters are the SR character, the three different block number (BN) characters and the EOB (end of block) character. Whenever any one of these characters appears at the input terminal of the character input matrix 7AC–241, a positive potential corresponding to that character appears on the corresponding output lead of the matrix.

The first character which should appear at the input of the character recognition matrix 7AC–241 when transmission is commenced between the transmitter and receiving stations should be the SR character. When the receiving station is in the SR mode of operation, any other characters which might be recognized by the character recognition matrix 7AC–241 will have no affect on the operation of the system. Whenever an SR character is detected by the matrix 7AC–241, however, a positive output potential appears on the output lead 7A–245, 6D–245 and is applied to the inputs of a pair of AND gates 6D–209 and 6C–210. A second input to the AND gate 6C–210 is obtained from the output of an inhibit gate 6C–208 and this input also is positive at this time since the inhibit input to the inhibit gate 6C–208 normally is negative and the other input to the inhibit gate 6C–208 is the positive potential obtained from the SR stage of the programmer 6B–200.

As a consequence, when the programmer 6B–200 is in the SR mode, and an SR character has been detected by the character detection matrix 7AC–241, the AND gate 6C–210 is enabled so that the next programmer advance pulse appearing on the lead 6C–212, 8D–212 will be passed by the AND gate 6C–210 and through an OR gate 6C–213 to the input of a one-shot multivibrator 6A–215, the output of which is supplied to a pulse amplifier 6A–217, the output of which in turn is a source of drive or advance pulses for the programmer 6B–200.

The programmer advance pulses which are applied to the lead 6C–212, 8D–212 are derived from a sample pulse which is obtained in any suitable manner from the receiving distributor, this pulse occurring once for each character received by the receiving distributor. The sample pulse is a positive going pulse one bit wide applied to an input terminal 8A–270. It appears on the input terminal 8A–270 when a character is available in the receiving distributor 32 (FIG. 1) and provides the basic timing for the receiving station control circuit. This pulse is delayed by a signal delay circuit 8A–271, the output of which is inverted by an inverter 8A–272 and supplied to the input of a pulse amplifier 8A–273. The output of the pulse amplifier 8A–273 is a positive going pulse of shorter duration than the input sample pulse applied to the terminal 8A–270 and, of course, appears a predetermined time after the application of the input sample pulse to the input of the signal delay circuit 8A–271. The output of the pulse amplifier 8A–273 then is applied to the input terminal of an inhibit gate 8B–275. This gate has a positive input applied to its inhibit input terminal only during the delete (DEL) mode of operation or in the case of an incomplete block reception, so that a negative potential now appears on the inhibit input of the gate 8B–275. The output pulse which is obtained from the output of the inhibit gate 8B–275 then is passed through an OR gate 8B–276 over the lead 8D–212, 6C–212 and comprises the programmer advance pulse. The first of these pulses which occurs, is the advance pulse which advances the programmer from the SR to the BN mode of operation.

When an output pulse from the one-shot multivibrator 6A–215 occurs, it is applied to all of the stages of the programmer 6B–200, turning "off" any stage which is conducting, which in turn causes the next stage of the ring counter to be turned "on." The first programmer advance pulse occurring after detection of the SR character, causes the programmer to be advanced from the SR stage to the BN stage or mode of operation when the output of an OR gate 6A–205 connected to the output of the SR stage drops from a positive potential to a negative potential. When this occurs, the output of the BN stage of the programmer 6B–200 rises to a positive potential and the outputs of the remaining stages are at a negative potential.

The programmer advance pulse obtained from the output of the one-shot multivibrator 6A–215 also appears on the inhibit input of an inhibit gate 6A–216, but it has no affect upon the output of the inhibit gate 6A–215 since the other input to the inhibit gate 6A–216 is obtained from the negative output of the BN stage of the programmer 6B–200. As a consequence, the output of the inhibit gate 6A–216 remains negative at this time.

When the programmer 6B–200 advances to the BN mode of operation, a positive output pulse is obtained from the output of the BN stage of the programmer and is applied over a lead 6A–218, 9A–218 to the trigger input 1A of the reverse channel flip-flop 9C–310 causing the flip-flop 9C–310 to be set to its "1" state. As stated previously, this flip-flop was set to its "0" state when the programmer was in the SR mode, so that a negative output was obtained from the "1" output of the flip-flop. The "1" output of the flip-flop 9C–310 is inverted by an inverter 9C–311, the output of which is supplied to the digital dataset 31 (FIG. 1) controlling the reverse channel signal supplied from the digital dataset 31 in the receiving station to the digital dataset 21 (FIG. 1) in the transmitting station. Whenever the signal applied to the input of the digital dataset 31 (FIG. 1) is a positive potential, the reverse channel is turned "off." Thus, prior to the reception of an SR character, the reverse channel was turned "off." After reception of an SR character, allowing the programmer 6B–200 to be advanced from the SR to the BN mode of operation, the "1" output of the reverse channel flip-flop 9C–310 rises to a positive potential. This output then is inverted by the inverter 9C–311 causing a negative signal to be supplied to the digital dataset 31 (FIG. 1). This in turn causes the reverse channel to be turned "on" thereby indicating to the transmitting station that the receiving station has recognized an SR character and is ready for the receipt of information.

While the programmer 6B–200 is in the BN mode of operation, the programmer advance pulses applied to the inhibit gate 6C–207 are inhibited until another character other than an SR character is detected. So long as SR characters are being detected, a positive potential is obtained from the output of the AND gate 6D–209 and is applied through the OR gate 6C–206 to the inhibit input of the inhibit gate 6C–207. This prevents the passage of any program advance pulses by the inhibit gate 6C–207. Since the output of the inhibit gate 6C–208 is negative whenever the programmer is in any mode of operation other than the SR mode of operation the programmer advance pulses also are prevented from being passed by the AND gate 6C–210. When a character other than an SR character is received, however, the output of the AND gate 6D–209 drops to a negative potential thereby causing the output of the OR gate 6D–208 to drop to a negative potential since all of the other inputs to the OR gate 6C–206 are obtained from stages of the programmer 6B–200 which have a negative output potential at this time. As a consequence, the next character received by the transmitting distributor 32 (FIG. 1) giving rise to application of a sample pulse on input terminal 8A–270 causes the generation of a programmer advance pulse which is passed by the inhibit gate 6C–207 and the OR gate 6C–213 to trigger the programmer advance one-shot multivibrator 6A–215. When the output pulse from the multivibrator 6A–215 appears, it causes the programmer to advance from the BN mode of operation to the BK mode of operation in the manner of an ordinary ring counter.

The first character received following the SR characters, should be a block number (BN) character. In addition, this next character should occur when the receiving station programmer 6B–200 is in the BN mode of operation. In this mode of operation, a positive potential is applied over the lead 6A–218, 7C–218 to one input of each of three AND gates 7A–246, 7A–247 and 7A–248. The other input to each of these AND gates is obtained from the output of the character recognition matrix 7AC–241 corresponding to a different one of the three block members utilized in this system. For purposes of illustration, assume that the AND gate 7A–246 is associated with block number 1 (BN1), AND gate 7A–247 is associated with block number 2 (BN2), and AND gate 7A–248 is associated with block number 3 (BN3). Any one of these three block numbers may be detected by the character recognition matrix 7AC–241 at this time. The particular block number detected causes a positive input signal to be applied to the input of the AND gate 7A–246 to 7A–248 which corresponds to that block number. Thus, the output of that particular AND gate will rise to a positive potential while the outputs of the other two AND gates remain at a negative potential. This output representative of the received block number is compared with the block number obtained from a block counter 7B–250 which is a conventional three-stage ring counter. At this time, prior to the reception of any information from the transmitting station, the block counter 7A–250 could be set to any one of its three states, the particular state to which it is set having a positive output potential and the remaining two stages having a negative output potential.

The comparison between the received block number indication and the block number obtained from the counter 7B–250 is made in three groups of gating circuits 7D–251, 7D–252 and 7D–253, each of these circuits consisting of three AND gates, the outputs of which are combined in a common OR gate. In the gating circuit 7D–251 the three possible block number outputs obtained from the receiving station block counter 7B–250 each are compared with the block number output of the respective AND gate 7A–246, 7A–247 or 7A–248 corresponding to the next lower block number. For example, the output of the second stage (corresponding to BN2) of the counter 7B–250 is compared in one of the AND gates of the gating circuit 7D–251 with the output of the AND gate 7A–246 (corresponding to received BN1). In like manner the output of stage 3 (BN3) of the counter 7B–250 is compared with the received BN2 obtained from the output of the AND gate 7A–247, and the output of stage 1 (BN1) of the counter is compared with the output of AND gate 7A–248 (received BN3). If any one of these comparisons causes positive potentials to be applied to both inputs of the corresponding AND gate in the gating circuit 7D–251, a positive output is obtained from the output of the OR gate in the gating circuit 7D–251 causing a positive priming potential to be applied to the P1A priming input of a block low register flip-flop 7D–254. The output of the OR gate in the gating circuit 7D–251 also is inverted by an inverter 7D–255; so that whenever none of the AND gates in the gating circuit 7D–251 has a positive output, a positive output is obtained from the output of the inverter 7D–255 thereby priming the POA priming input of the flip-flop 7D–254.

In a similar manner, a comparison of like block numbers is made in the gating circuit 7D–252, and a comparison of each block number generated by the block counter 7B–250 with the next higher received block number is made in the gating circuit 7D–253. For example, if a positive output potential is obtained from stage "1" (BN1) of the block counter 7B–250 and a positive potential is obtained from the output of the AND gate 7A–246 (corresponding to received BN1) a positive potential is obtained from the output of the OR gate in the gating circuit 7D–252. This output signal then is passed through an OR gate 7D–256 over lead 7D–257, 8C–257 to act as a positive priming signal on the P0A input of the errored block register flip-flop 8C–280. Likewise if a positive output potential is obtained from stage "1" (BN1) of the counter 7B–250 and a positive output potential is obtained from the output of the AND gate 7A–247 (corresponding to received BN2) a positive output potential is obtained from the output of the OR gate in the gating circuit 7D–253 indicating that the received block number is "high" with respect to the block number expected by the receiving station. This block "high" indication is applied over lead 7D–258, 9C–258 to the priming input P0A of the reverse channel control flip-flop 9C–310.

If a block "high" indication is obtained, as evidenced by a positive potential on the lead 7D–258, 9C–258, it indicates that the received block number is for a block of the message which is one block later in sequence than the block which the receiving station expected to receive. To remedy this situation, it is necessary to reverse the data record in the transmitting station one block in order to bring the transmitted block into synchronization with the block expected by the receiving station. Thus a positive potential is applied to the priming input P0A of the reverse channel flip-flop 9C–310. The sample pulses which are obtained from the inverted output of the signal delay circuit 8A–271 and inverted by the inverter 8A–272 are additionally delayed for a short period of time by a signal delay circuit 8A–278, the output of which is supplied to a pulse amplifier circuit 8A–279 which is similar in function to the pulse amplifier 8A–273. The output of the pulse amplifier 8A–279 is a positive going pulse of relatively short duration, occurring subsequently to the application of the programmer advance pulse over the lead 8D–212, 6C–212, and is applied over a lead 8A–281, 9C–281 to the 0A trigger input of the reverse channel control flip-flop 9C–310. If the block number "high" indication exists at this time, the flip-flop 9C–310 is set to its "0" state causing a positive output to appear on its "0" output and a negative output to appear on its "1" output. The negative 1 output is inverted by the inverter 9C–311 causing a positive signal to be applied to the digital dataset 31 (FIG. 1) which then turns the reverse channel "off." As stated previously in the discussion of the transmitting station circuit, this causes the transmitter to reverse two full blocks when the sample of the reverse channel is made at the end of the block being transmitted. Since the reverse channel is turned "off" at the beginning of transmission of the block, the number of which caused the block "high" indication, this reversal of two full blocks at the transmitting station provides reversal to the block having the next lower block number as desired.

The same sample pulse which was delayed by the signal delay circuit 8A–278 and applied through the pulse amplifier 8A–279 over the lead 8A–281, 9C–281 to set the reverse channel flip-flop 9C–310 to its "0" state, also constitutes the programmer advance pulse applied over the lead 8D–212, 6C–212 and used to advance the programmer 6B–200 out of the BN mode into the BK mode of operation. This pulse is applied through the OR gate 6C–213, in the manner previously described, to the one-shot multivibrator 6A–215 to advance the programmer upon termination of the timing interval of the one-shot multivibrator. The output pulse obtained from the OR gate 6C–213 also is applied over a lead 6C–220, 8C–220 to the 1B trigger input of the error indication flip-flip 8C–280.

It should be noted that the pulse appearing on the lead 6C–220, 8C–220 occurs prior to the pulse obtained from the output of the one-shot multivibrator 6A-215. As a consequence, the programmer 6B-200 still is in the BN mode of operation causing a positive priming potential to be applied over the lead 6A–218, 8C–218 to the P1B priming input of the flip-flop 8C–280. Thus, when the trigger pulse is applied to the 1B trigger input of this flip-flop, the flip-flop 8C–280 is set to its "1" state. This state indicates an error and if the flip-flop 8C–280 is not rest to its "0" state subsequently in the cycle of operation of the circuit, an error indication will be recorded by the receiving station. If none of the three possible block numbers are received when the station is in the BN mode, the error register flip-flop 8C–280 will remain set to its "1" or error indicating state causing the receiving station to register an error at the end of the block as will be explained in detail subsequently. The reverse channel is not turned "off" at the beginning of the block with the errored block number, however, since a negative potential is applied to the P0A priming input of the reverse channel control flip-flop 9C—310. The reverse channel control flip-flop is turned off at the beginning of a block only when a block "high" condition is detected.

The output of the pulse amplifier 8A–279 which causes the reverse channel flip-flop 9C–310 to turn "off" the reverse channel for the recorded block "high" condition also is applied to the 0A trigger input of the error register flip-flop 8C–280. This pulse has no affect on the flip-flop 8C–280 at this time since a negative priming is applied to the P0A priming input over the lead 7D–257, 8C–257 from the output of the OR gate 7D–256 caused by the fact that the block "low" register flip-flop 7D–254 is set to its "0" state and a block "high" indication was obtained from the block number comparison.

When the programmer advance pulse then is obtained from the output of the one-shot multivibrator 6A–215, the negative going transition of this output pulse is applied to the inhibit input of the inhibit gate 6A–216 which is of the same type as inhibit gates 6A–203 and 6A–204. This causes a positive pulse to be obtained from the output of the inhibit gate 6A–216 since the programmer 6B–200 is in the BN mode of operation causing a positive input potential to be applied to the other input of the inhibit gate 6A–216. The output pulse from the gate 6A–216 is applied over a lead 6A–221, 7D–221 to the 1A and 0A trigger inputs of the block "low" register flip-flop 7D–254. Since a block "high" indication was obtained in the example under consideration, the P0A priming input to the flip-flop 7D–254 is positive at this time causing the flip-flop to be set to its "0" state. This causes a positive output to be obtained from the "0" output of the flip-flop 7D–254 and this positive potential is applied over a lead 7D–260, 8C–260 to the P1A priming input of the error register flip-flop 8C–280. This condition indicates that the received block was not "low." The flip-flop 7D–254 remains set to this condition until the system next goes into the BN mode of operation. The same result is obtained when the compared block numbers are the same.

Whenever a block "low" indication is made in the block number comparison gates, the P0A priming input of the flip-flop 7D–254 is negative and the P1A input is positive at the time the trigger pulse is applied to the flip-flop 7D–254 over the lead 6A–221, 7D–221 causing the flip-flop 7D–254 to be set to its "1" state. The pontential on the lead 7D–260, 8C–260 then is negative and the P1A input of the flip-flop 8C–280 is not primed. At the same time, the programmer 6B–200 is advanced from the BN to the BK mode of operation by the programmer advance pulse obtained from the one-shot multivibrator 6A–215. When this occurs, the output of the BK stage of the programmer 6B—200 rises to a positive potential, and the ouputs of the remaining stages are negative. When the receiving station is in the BK mode of operation, the recorder 36 (FIG. 1) normally must be enabled to record data. Prior to this time, during the SR and BN modes of operation, the recorder was rendered nonresponsive to the incoming data.

Control of the recorder is accomplished by means of an AND gate 8B–283, one input to which receives the programmer advance pulses obtained from the output of the OR gate 8B–276 once per character. The other input to the AND gate 8B–283 is obtained from the output of an OR gate 8B–284 having two inputs, one obtained from the output of the BK stage of the programmer 6B–200 over the lead 6B–222, 8B–222 and the other obtained from the output of the DEL stage of the programmer 6B–200 over the lead 6B–223, 8B–223. When the programmer 6B–200 is in either the BK or DEL mode of operation a positive potential is applied to one of these two inputs, to the OR gate 8B–284, causing a positive potential to be obtained from its output thereby enabling the AND gate 6B–283. When the programmer 6B–200 is in any other mode of operation other than the BK or DEL mode of operation the output of the OR gate 8B–284 is negative, blocking the passage of pulses by the AND gate 8B–283.

The programmer advance pulses applied to the input of the AND gate 8B–283 when the programmer is in the BK or DEL mode of operation are passed through the AND gate 8B–283 and constitute gated clock pulses applied over a lead 8B–285, **9C–285*a* to the input of an inhibit gate 9C–312. The inhibit input for the inhibit gate 9C–312 is obtained from the "1" output of the block "low" flip-flop 7D–254 over the lead 7D–262, 9C–262. This output is a positive potential only when the output of the block comparison circuit indicates a block "low" comparison. Since in the present example a block "high" indication was obtained, a negative potential is applied over the lead 7D–262, 9C-262*a* thereby allowing the clock pulses appearing on the lead 9C–285*a* to be passed by the inhibit gate 9C–312. Pulses obtained from the output of the inhibit gate 9C–312 are applied to a gated one-shot multivibrator 9C–313 which is primed to respond to the applied pulses by a positive potential obtained from the inverted output of the BU stage of the programmer 6B–200. The output of the multivibrator 9C–313 constitutes the recorder command pulses supplied to the recorder 36 (FIG. 1) to cause the recorder to record the character available in the receiving distributor 37 (FIG. 1) at the time each command pulse is received by the recorder. These command pulses also are applied through an OR gate 9C–314 to one input of an AND gate 9A–315, the other input of which is obtained from the output of the DEL stage of the programmer 6B–200. Since the output of the DEL stage of the programmer is negative at this time, these pulses are not passed by the AND gate 9A–315**.

In order for the receiving station to ascertain when a full block of characters has been received, so that the programmer may be advanced from the BK mode of operation to the EOB mode of operation, a character counter 9AB–316 is provided. When the programmer 6B–200 is stepped into either the BK or DEL stage the positive output pulse obtained from the output of the OR gate 8B–284 is supplied over a lead 8B–286, 9A–286 and through an OR gate 9A–344 to an inverter 9A–345. The output of the inverter 9A–345 is a negative pulse which is applied to the inhibit input of an inhibit gate 9A–346, the other input to which is permanently connected to a source of positive potential. The inhibit gate 9A–346 is similar to the inhibit gates 6A–203 and 6A–204, so that a positive pulse is obtained from its output and is passed by an OR gate 9A–320 to reset the character counter 9AB–316 to its "0" count.

When the system is in the BK mode of operation, the control pulses for the receiving station operation are obtained by detecting the steps made by the record medium in the recorder 36 (FIG. 1), each step of the medium providing one control pulse. These control pulses may be obtained in the recorder 36 (FIG. 1) in any suitable manner and are applied to an input terminal 9B–318 and pass through a signal delay circuit 9B–319, which provides a delayed positive output pulse for each input pulse applied to the terminal 9B–318.

The pulses obtained from the output of the signal delay circuit 9B–319 are applied to a one-shot multivibrator 9B–331 which supplies trigger input pulses to a gated one-shot multivibrator 6AC–228 over a lead 9B–333, 6C–333. The one-shot multivibrator 6AC–228 is triggered only when a positive potential is applied to its P1 priming input from an output of an OR gate 6A–229 which has positive input potentials applied to it only when the programmer 6B–200 is in the BK and EOB modes of operation. Thus, each time that a pulse appears on the lead 9B–333, 6C–333 during these two modes of operation, the one-shot multivibrator 6AC–228 is triggered causing an output pulse to appear on the lead 6C–230, 10A–230. The data recorded by the recorder is supplied to the inhibit input of a plurality of inhibit gates 10AC–360, each corresponding to a different level of the code in which the character is encoded. The character set pulse applied to the lead 10A–230, 6C–230 from the output of the one-shot multivibrator 6AC–228 is applied in parallel to the other inputs of the inhibit gates 10AC–360, the outputs of which then represent the permutation encoded character which was recorded by the recorder. These output pulses are passed through a corresponding set of OR gates 10AC–361 to a parity check character generator 10AC–362 of any suitable type where a parity check character based on the recorded data is generated.

The output pulses from the signal delay circuit 9B–319 also are applied to the input of an inhibit gate 9A–321, the inhibit input of which is obtained from the "1" output of the block "low" flip-flop 7D–254 over the lead 7D–262 and **9A–262*b*. The potential on this lead is negative at all times except when a block "low" condition exists, so that the control pulses are passed by the inhibit gate 9A–321 and are applied to the input of a second inhibit gate 9A–322 which also passes these pulses since the inhibit input of this inhibit gate is connected to the output (now negative) of the DEL stage of the programmer 6B-200 over the lead 6B–223, 9A–223. The output pulses passed by the inhibit gate 9A–322 then pass through an OR gate 9A–324 to trigger a pulse amplifier 9A–325, the output of which provides the advance pulses for the character counter 9AB–316**.

Thus, each time the record medium in the recorder 36 (FIG. 1) advances one step, indicating the recording of one character of the message, the character counter 9AB–316 also is advanced one step. For the purpose of illustration, assume that 80 characters constitute a block of information in the preferred embodiment of this invention. Thus, when the recorder 36 (FIG. 1) has recorded 80 characters it is necessary for the programmer 6B–200 to step to the EOB mode. When the character counter 9AB–316 reaches a count of 79, a positive output potential is applied to one input of an AND gate 9B–327, the other input to which is the inverted output obtained from the BU stage of the programmer 6B–200 and applied over a lead 6B–226, 9B–226 to the input of an inverter 9B–326. Since the output of the BU stage of the programmer 6B–200 is negative at this time, the output of the inverter 9B–326 is positive, causing a positive output to be obtained from the output of the AND gate 9B–327 at the count of 79.

The positive output of the AND gate 9B–327 primes a pulse amplifier 9B–328 but has no affect on its output at this time. When the counter 9AB–316 steps from a count of 79 to a count of 80, the output of the AND gate 9B–327 is a negative pulse transition which triggers the pulse amplifier 9B–328 to produce a positive pulse comparable in duration to the programmer advance pulse applied over the lead 8D–212, 6C–212. The pulse obtained from the output of the pulse amplifier 9B–328 is applied over a lead 9B–329, 6C–329 to the input of the OR gate 6C–213. The output of the OR gate 6C–213 then triggers the one-shot multivibrator 6A–215, the output of which constitutes the next programmer drive pulse for the programmer 6B–200.

It should be noted that the normal programmer advance pulses which are applied over the lead 8D–212, 6C–212 are prevented from being applied to the OR gate 6C–213, since the positive output obtained from the BK stage of the programmer 6B–200 is applied through the OR gate 6C–206 to the inhibit input of the inhibit gate 6C–207 preventing passage of the programmer advance pulses by the gate 6C–207. As stated previously, the AND gate 6C–210 blocks these programmer advance pulses since the output of the inhibit gate 6C–208 is negative in all but the SR mode of operation of the receiving station.

When the programmer 6B–200 is advanced from the BK mode of operation to the EOB mode of operation, the output of the EOB stage of the programmer 6B–200 rises to a positive potential and the outputs of the remaining stages are at a negative potential. When the receiving station is in the EOB mode of operation, the next character to be received by the receiving station should be the EOB character from the transmitting station indicating that the transmitting station has completed the transmission of a block of information. If an EOB character is transmitted at this time, the character recognition matrix 7AC–241 recognizes the EOB character, providing a positive output potential over the lead 7A–244, 8C–244 to the inhibit input of an inhibit gate 8C–288 thereby preventing the passage of any pulses by the inhibit gate 8C–288. Since the output of the inhibit gate 8C–288 is supplied to the input of an OR gate 8C–290, the output of the OR gate 8C–290 remains negative at this time, so that a negative potential continues to be applied to the 1A trigger input of the error recording flip-flop 8C–280, leaving the flip-flop set to the state to which it previously had been set.

In the event that an end-of-block character (EOB character) is not detected at this time, the potential on the lead 7A–244, 8C–244 is negative thereby enabling the inhibit gate 8C–288. Thus, the next programmer advance pulse obtained from the output of the OR gate 8B–276 and applied to the AND gate 8D–287 is passed by the AND gate 8D–287 since, in the EOB mode of operation, a positive potential is applied to the other input of the AND gate 8D–287 over the lead 6D–227, 8D–227. This pulse also is passed by the inhibit gate 8C–288 and the OR gate 8C–290 to the 1A trigger input of the flip-flop 8C–280. If the P1A priming input to the flip-flop 8C–280 is positive, indicating that the block comparison is not "low" wherein the block "low" flip-flop 7D–254 is set to its "0" state, the flip-flop 8C–280 is set to its "1" state if it already has not been set to that state. This then indicates the presence of an error to the receiving station.

This same programmer advance pulse, which is applied to the input of the AND gate 8D–287 to sample whether or not the proper EOB character was detected by the receiving station, also is applied through the inhibit gate 6C–207 and the OR gate 6C–213 to trigger the one-shot multivibrator 6A–215. This pulse is allowed to pass by the inhibit gate 6C–207 since all of the inputs to the OR gate 6C–206 are negative when the programmer 6B–200 is in the EOB state of operation. Following completion of the time period of the one-shot multivibrator 6A–215, the EOB stage of the programmer is turned "off" and it advances to the CK mode of operation.

When the programmer 6B–200 is in the CK mode of operation the output of the CK stage is a positive potential and the outputs of the remaining stages of the programmer are at a negative potential. The positive output of the CK stage is applied to the inhibit input of the inhibit gate 6A–204 but has no affect on the output of that gate at this time. The positive potential from the output of the CK stage also is applied over a lead 6B–225, 8A–225 to one of the three inputs to the AND gate 6C–289.

The next sample pulse applied to the terminal 8A–270 becomes the next programmer advance pulse applied over the lead 8D–212, 6C–212 in the manner described previously and is passed through the inhibit gate 6C–207 since all of the inputs to the OR gate 6C–206 are negative when the programmer 6B–200 is in the CK mode of operation. This same sample pulse also is applied from the output of the pulse amplifier 8A–273 to an AND gate 8A–292 and is passed by the AND gate since the other input to the AND gate 8A–292 is the positive potential obtained from the CK stage of the programmer 6B–200 over the lead 8A–225, 6B–225. The pulse obtained from the output of the AND gate 8A–292 constitutes a trigger pulse for comparing the parity check character which is being received from the transmitter at this time with the parity check character which was generated at the receiving station over the previous block. This trigger pulse is applied over a lead 8A–293, 10B–293 to the inputs of a plurality of inhibit gates 10BD–365. The other input applied to the inhibit input of these inhibit gates 10BD–365 is obtained from the receiving distributor 32 (FIG. 1) for each received character. Since the output of the AND gate 8A–292 is negative at all times except when the system is in the CK mode of operation the inhibit gates 10BD–365 normally are disabled during the receipt of the block of data information by the receiving station.

At the time a positive pulse is applied over the lead 10B–293, 8A–293, the outputs of the inhibit gates 10BD–364 are a permutation coded combination of positive and negative signals corresponding to the inverted parity check character which was received by the receiving station from the transmitting station. Those OR gates 10AC–361 which are connected to inhibit gates 10BD–365 having a positive output pulse pass a positive pulse to the corresponding positions or levels in the parity check character generator 10AC–362. The inverted parity check character applied to the inputs of the inhibit gates 10BD–365 should be the mirror image of the parity check character which was generated in the check character generator 10AC–362 for the previous block. Thus, when the outputs of the OR gates 10AC–361 correspond to this inverted parity check character, the affect on the parity check character generator 10AC–362 should be to set all stages of the generator in the "0" state to the "1" state so that all of the inputs to a check character read-out AND gate 10AC–363 should be positive, causing the output of the AND gate 10AC–363 applied to an inverter 10AC–364, to be positive at this time. This causes a negative potential to be applied on a lead 10C–366, 8C–366 and indicates that the previous block was received error free. Thus, when the delayed trigger pulse is obtained from the output of the pulse amplifier 8A–279 and is supplied to the input of the AND gate 8C–289, it has no affect on the output of the AND gate since the gate is not enabled if the previous block was not errored; and the errored register flip-flop will remain set to whatever state it was in prior to this time. As described previously, if there has been no errored block number or no block "high" condition and the end-of-block (EOB) character occurs at the proper time, the flip-flop 8C–280 is in its "0" state when the receiving station reaches the CK mode of operation.

If the flip-flop 8C–280 is set to its "0" state indicating no error, the "0" output of the flip-flop is positive and is applied over a lead 8C–282, 6A–282 to the input of an inhibit gate 6C–204. When the one-shot multivibrator times out, the advance pulse obtained from its output turns "off" the CK stage of the programmer 6B–200 to advance it to the next mode of operation. The negative pulse obtained from the output of the CK stage when it is turned "off" causes a positive pulse to be obtained from the output of the inhibit gate 6A–204 since the other input to the inhibit gate from the output of the error register flip-flop 8C–280 is positive at this time. This positive pulse is passed by the OR gate 6A–205 and causes the programmer 6B–200 to be reset to its BN mode of operation, since the output from the OR gate 6A–205 is of longer duration than the pulse obtained from the output of the CK stage which is applied to the input of the BU stage of the programmer 6B–200 when the CK stage is turned "off."

The output of the inhibit gate 6A–204 also is applied over a lead 6A–232, 7B–232 to the input of an inhibit gate 7B–264 which allows this pulse to pass if the previous block number comparison made by the receiving station indicated that the block number received was not "low" with respect to the block number obtained from the output of the block counter 7B–250. If this condition exists, the "1" output of the block number comparison flip-flop 7D–254 is negative and is applied to the inhibit input of the inhibit gate thus enabling the inhibit gate 7B–264 to pass the block counter advance pulse applied to its other input. This pulse then is applied to the block number ring counter 7B–250 to advance it to the next block number in sequence.

Following this operation, the receiving station is back in its BN mode of operation awaiting transmission from the transmitting station of the next block number, upon receipt of which the foregoing cycle of operation of the receiving station from the BN through the CK modes of operation once again takes place.

If the parity check character comparison of the parity check character generated at the receiver with the check character received indicates that the two characters are not the same, one or more of the inputs to the OR gate 10AC–363 is positive at the time of this comparison, causing a positive potential to be applied over the lead 10C–364, 8C–364 to the input of the AND gate 8C–289. In the CK mode of operation the second input applied over the lead 8A–225, 6B–225 to the AND gate 8C–289 also is positive at this time thereby causing the AND gate 8C–289 to be enabled. Thus, when the delayed trigger pulse is obtained from the output of the pulse amplifier 8A–279, it is passed by the AND gate 8C–289 and the OR gate 8C–290 to the 1A trigger input of the error register flip-flop 8C–280. If the block number comparison made at the beginning of the block indicated that the received block number was not "low" with respect to the locally generated block number, a positive potential is applied from the "0" output of the flip-flop 7D–254 over the lead 7D–260, 8C–260 to the P1A priming input of the flip-flop 8C–280. At the time the trigger pulse is applied to the 1A trigger input of the flip-flop, the flip-flop 8C–280 then is set to its "1" state indicating that an error has occurred.

It should be noted at this time that the flip-flop 8C–280 also is set to its "1" state when a block "high" indication occurs and whenever the system is in the EOB mode of operation an EOB character was not detected. Thus, an error indication is made whenever a block "high" indication exists, EOB is not detected, the character received during the BN mode was not one of the three block numbers, or the parity check character comparison indicates that the locally generated parity check character is not the same as the received parity check character. If any of these situations exists, the "0" output of the error register flip-flop 8C–280 is negative causing a negative potential to be applied over the lead 8C–282, 6C–282 to the inhibit gate 6A–204. As a consequence, no pulse then is obtained from the output of the inhibit gate 6A–204 when the programmer 6B–200 is stepped out of the CK mode of operation. When this occurs, the programmer advances in its normal manner from the CK mode of operation to the back-up (BU) mode of operation instead of resetting to the BN mode. The BU stage then has a positive output potential and all the remaining stages of the programmer 6AB–200 have negative output potentials.

When the programmer steps into the BU mode, a positive signal is applied through the OR gate 6C–206 to the inhibit input of the inhibit gate 6C–207, preventing further programmer advance pulses from affecting the operation of the programmer 6B–200. The positive-going pulse obtained from the output of the BU stage of the programmer 6B–200 is applied over the lead 6D–226, 8D–226 and is passed by an OR gate 8D–295 and a fan out gate 8D–296, one output of which resets an incomplete block register flip-flop 8D–297 to its "0" state and another output of which is applied over a lead 8D–298, 9C–298 to reset the reverse channel flip-flop to its "0" state of operation. When this occurs, the reverse channel is turned "off" in the manner described previously. This then causes the transmitting station to go into its error mode of operation, reversing two blocks.

At the same time, the positive potential applied over lead 6D–226, 9C–226*a* is inverted by an inverter 9C–340, the output of which removes the priming potential from the one-shot multivibrator 9C–313 thereby preventing further operation of the one-shot multivibrator 9C–313 by the output pulses obtained from the inhibit gate 9C–312. As a consequence, no recorder command pulses are supplied to the recorder 36 (FIG. 1) during the BU mode of operation.

The positive potential applied over the lead 6D–226, 9C–226*b* enables a normally disabled conventional gated oscillator 9C–342, the output pulses from which are supplied to the recorder over a lead 9A–343 to cause the recorder to step in the reverse direction. The manner in which this is accomplished forms no part of this inveniton, and preferably the reversing mechanism for the recorder is of the type disclosed in the aforementioned copending Rothlisberger application. The output of the one-shot multivibrator 9C–342 also is passed by the OR gate 9A–344 to reset the character counter 9AB–316 to its "0" count in the manner described previously. When the system is in the BU mode of operation, the record advance detection pulses applied to the input terminal 9B–319, after being delayed by the delay circuit 9B–319, are passed by the inihibit gates 9A–322 and 9A–322 and the OR gate 9A–324 to trigger the pulse amplifier 9A–325 which supplies the advance pulses for the character counter 9AB–316.

During the operation of the system in the BU mode of operation, the block comparison flip-flop 7D–254 remains set to its "0" state of operation indicating that the block number comparison was a block number not "low." The "1" output of the flip-flop 7D–254 then is negative causing a negative potential to be applied over the lead 7D–262, 9A–262_b_ thereby enabling the inhibit gate 9A–321. At the same time the inhibit gate 9A–317 is disabled since a positive potential is applied to it from the "0" output of the flip-flop 7D–254 over the lead 7D–260, 9A–260.

It should be noted that the receiving station programmer never is advanced to the BU mode of operation if a block number "low" comparison is indicated by the flip-flop 7D–254. When this occurs, the P1A priming input for the error register flip-flop 8C–280 is negative so that neither an EOB detection error nor a parity check character error can trigger the flip-flop 8C–280 to its "1" state. The only other manner in which the error register flip-flop 8C–280 can be set to its "1" state, indicating an error is for a block "high" comparison to be made in which event, of course, the block number comparison flip-flop 7D–254 would not be set to the state indicating a block "low" condition. As a consequence, it is impossible for the system to advance into the BU mode of operation following receipt of a block which was preceded by a block number which was "low."

The character counter also is utilized to count the proper number of reverse steps made by the recorder, so that it may be ascertained when a full block of information has been reversed by the recorder. When the system is in the BU mode of operation, a positive potential is applied over the lead 6D–226, 9B–226_c_ to enable an AND gate 9B–330. This potential also is inverted by the inverter 9B–326 causing a negative potential to be applied to one of the inputs of the AND gate 9B–327. As a consequence, when the system is in the BU mode of operation, no output pulse is obtained from the output of the AND gate 9B–327 when the character counter reaches count number 70. When count number 80 is reached, however, a positive pulse is obtained from the output of the AND gate 9B–330 and is applied to the inhibit input of an inhibit gate 9D–331. This output from the AND gate 9B–330 also is inverted by an inverter 9B–332, the output of which is applied to the inhibit input of a second inhibit gate 9D–333.

When the back up of the record medium in the recorder is complete, a back up switch 9D–335 in the recording mechanism closes, causing a positive pulse to be applied through a delay circuit 9D–336 to the inputs of the gates 9D–333 and 9D–331. The delay circuit causes a short delay in this pulse in order to allow the inhibit inputs to the inhibit gates 9D–331 and 9D–333 to arrive prior to the application of the pulse caused by the closure of the contact 9D–335. If there have been 80 characters counted, this pulse obtained from the output of the delay circuit 9D–336 is passed by the inhibit gate 9D–333 and is blocked by the inhibit gate 9D–331. A positive pulse then is applied over a lead 9D–337, 6C–337 and is passed by the OR gate 6C–213 to trigger the one-shot multivibrator 6A–215 causing the programmer to advance to its next mode of operation.

In the event that 80 characters have not been counted at the time that the contact 9D–335 is closed, the pulse obained from the output of the delay circuit 9B–336 is blocked by the inhibit gate 9D–333 and is passed by the inhibit gate 9D–331, the output of which is applied to the 1A trigger input of the back up error register flip-flop 9D–338, the P1A priming input of which is permanently connected to a positive priming potential. This causes a positive potential to be obtained from the "1" output of the flip-flop 9D–338, and this potential is passed by an OR gate 9D–339 over the lead 9D–201, 6B–201 through the OR gate 6B–202 to reset the programmer 6B–200 to its SR mode of operation. At the same time, the output of the OR gate 9D–339 is utilized to energize an alarm circuit (not shown) since the receiving station recorder reversal mechanism apparently has malfunctioned.

Normally, however, the closure of the contact 9D–335 occurs when the character counter 9AB–316 has reached a count of 80 and the flip-flop 9D–338 is not set to its "1" state. As stated previously, the output pulse obtained from the inhibit gate 9D–333 causes the programmer to advance from the BU to the delete (DEL) mode of operation. When the programmer 6B–200 is in its delete mode of operation, a positive potential is obtained from the output of the DEL stage, and the outputs of the remaining stages of the programmer drop to a negative potential. This positive potential is passed by the OR gate 6C–206 to the inhibit input of the inhibit gate 6C–207 preventing the passage of programmer advance pulses applied over the lead 6C–212. When the output of the BU stage of the programmer 6B–200 drops to a negative potential this potential is inverted by an inverter 9C–340 causing a positive priming potential once again to be applied to the gated one-shot multivibrators 9C–313. At the same time a positive potential from the output of the DEL stage of the programmer 6B–200 is applied over the lead 6B–223, 8B–223 through the OR gate 8B–284 to one input of the AND gate 8B–283 thereby enabling that gate. The output of the OR gate 8B–284 also is applied over a lead 8B–286, 9A–286 through the OR gate 9A–344, the output of which is utilized to reset the character counter 9AB–316 to its "0" count as described previously.

If the block number comparison flip-flop 7D–254 is set to its "0" state indicating that the block number comparison was not "low," the inhibit gate 9A–317 remains blocked. The inhibit gate 9C–312, however is enabled since a negative potential is applied over lead 9C–262_a_, 7D–262 from the "1" output of the flip-flop 7D–254.

When the programmer is in the delete mode of operation, the positive potential on lead 6B–223, 8B–223 is passed through an OR gate 8B–299 and is applied to the inhibit input of the inhibit gate 8B–275 thus blocking the passage of the delayed sample pulses which are supplied to the input terminal 8A–270. The output of the OR gate 8B–299 also is inverted by an inverter 8B–300 which then applies a negative signal to a gated oscillator 8B–301, triggering the oscillator into operation. This gated oscillator may be of any suitable type but preferably is of the type disclosed in the aforementioned C. J. Rocca patent. The gated oscillator 8B–301 provides timing pulses through the OR gate 8B–276 which are passed by the AND gate 8B–283 and constitute gated clock pulses on the lead 8B–285, 9C–285_a_. These pulses are passed by the inhibit gate 9C–312 and trigger the one-shot multivibrator 9C–313 once for the application of each input pulse.

It is to be noted that the one-shot multivibrator 9C–313 is primed for operation at this time due to the fact that a positive potential is applied to its priming input P1 from the output of the inverter 9C–340. The output pulses from the one-shot multivibrator 9C–313 are supplied to the recorder to cause it to record the signals presented to its input. These pulses also are passed by the OR gate 9C–314 and the AND gate 9A–315, the other input of which is the positive potential obtained from the lead 9A–223, 6B–223 when the system is in the DEL mode of operation. From the AND gate 9A–315 the pulses are passed by the OR gate 9A–324 and trigger the character counter drive amplifier 9A–325.

When the system is in the DEL mode of operation, a positive potential is applied over the lead 6A–223, 7C–223 to all of the OR gates 7AC–243 causing a positive potential to be obtained from the outputs of all of these gates. Thus, the DEL mode output signal overrides any other signals which might be applied to the inputs of the gates 7AC–243 causing the recorder to record a delete character over the block of characters previously recorded in the block, which was pulled back and which now is being rerun through the recorder in the forward direction under control of the recorder command pulses fom the output of the multivibrator 9C–313.

When the character counter reaches the count of 70, a positive output pulse is passed by the AND gate 9B–327, in the manner previously described, and is applied over the lead 9B–329, 6C–329 and through the OR gate 6C–313 to trigger the one-shot multivibrator 6A–215. When the one-shot multivibrator 6A–215 times out, the output of the DEL stage of the programmer 6B–200 goes to a negative value which in turn causes a positive output pulse to be obtained from the output of the inhibit gate 6B–203. This pulse is passed by the OR gate 6B–202 and is supplied to the SR stage of the programmer 6B–200 to reset the programmer to the SR mode of operation. Upon the subsequent receipt of an SR character from the transmitting station, the cycle of operation at the receiving station is repeated. If no errors are detected in the next block of information received, the programmer advances from the SR mode of operation to the CK mode of operation and back again to the BN mode of operation, as previously described.

In the event that the block number comparison of the received block number and the block number obtained from the output of the block counter 7B–250 indicates that the received block number is "low" with respect to the locally generated block number, a positive priming potential is applied to the P1A priming input of the flip-flop 7D–254. When the programmer 6B–200 then is stepped from the BN to the BK mode of operation, the block "low" register set pulse obtained from the output of the inhibit gate 6A–216 and applied over the lead 6A–221, 7D–221 to the 1A and 0A trigger inputs of the flip-flop 7D–254 sets the flip-flop to its "1" state of operation. When this occurs, a positive potential is applied to the inhibit input of the inhibit gate 9C–312 thereby blocking the passage of the gated clock stepping pulse applied to the input of that gate from the output of the AND gate 8B–283. As a consequence, no recorder command or drive pulses are obtained from the output of the one-slot multivibrator 9C–313 since the multivibrator is not triggered into operation.

The gated clock pulses obtained from the output of the AND gate 8B–283, however, are applied over the lead 8B–285, 9A–285*b* to the input of the inhibit gate 9A–317. The inhibit input to the inhibit gate 9A–317 has a negative potential applied to it during a block "low" condition since the inhibit input is obtained from the "0" output of the flip-flop 7D–254, over the lead 7D–260, 9A–260. Since the system is not in the DEL mode of operation, a negative potential also is applied to the inhibit input of the inhibit gate 9A–322, allowing the gated clock pulses to pass through the inhibit gates 9A–317 and 9A–322 to the OR gate 9A–324, which supplies the necessary advance pulses to the character counter 9AB–316. When the character counter steps from a count of 79 to a count of 80 a pulse is obtained on the lead 9B–329, 6C–329 to advance the programmer to the EOB mode of operation. Since the "0" output of the flip-flop 7D–254 is negative, the P1A priming input of the error register flip-flop 8C–280 has a negative potential applied to it over the lead 8C–260, 7D–260. Thus, the error register flip-flop 8C–280 cannot be set to the "1" state irrespective of whether or not the end of block character is detected or the parity check comparison indicates a difference in the parity check characters.

The system is allowed to continue running as if no error had occurred. Thus, after the CK mode of operation, the programmer 6B–200 is advanced to the BN mode of operation in the same manner as occurs when normal error-free transmission takes place. It should be noted, however, that the block which followed the block number "low" indication was not recorded at the receiving station. It further should be noted that when the flip-flop 7D–254 is set to its "1" state indicating a block "low" comparison, a positive potential is applied to the inhibit input of the inhibit gate 7B–264 thereby blocking the passage of the block advance pulse which is applied over the lead 7B–232, 6A–232 when the programmer is advanced from the CK to the BN mode of operation. As a consequence, the block number obtained from the output of the receiving station block counter 7B–250 remains the same for the next block number comparison. Since the transmitter now advances to the next block of information as it does for error-free transmission and reception between the stations, the next block number transmitted should be the same as the block number at the receiving station and the two stations will be in block synchronization. The block number comparison flip-flop 7D–254 then is set to its "0" state indicating the block number is not "low." This causes a negative potential to be applied to the inhibit input of the inhibit gate 9C–312 which then allows the passage of the gated clock pulses by that gate, causing the next block of information to be recorded at the receiving station by the recorder.

If, for some reason, a complete block of information is not received by the receiving station due to the sender stopping transmission, due to line breaks, etc., it is necessary for the receiving station to detect the loss of transmission and to complete the 80 characters of the block being received, record an error, and then delete that entire block of information from the record medium. This is accomplished by applying the delayed sample pulse obtained from the output of the pulse amplifier 8A–273 to the input terminal of a one-shot multivibrator 8D–302. The output of the multivibrator 8B–302 is applied to a gated oscillator 8B–303 which is reset each time an output pulse is obtained from the multivibrator 8B–302. So long as the receiving distributor sample pulse continues to be applied to the input terminal 8A–270 at normally expected intervals, the multivibrator 8B–302 continues to reset the gated oscillator 8B–303 prior to the time the gated oscillator can supply any output pulses. Whenever no incoming data occurs within a predetermined period of time in excess of the timing interval or cycle of the gated oscillator 8B–303, no sample pulses are obtained from the distributor and no output pulses are obtained from the one-shot multivibrator 8B–302. The gated oscillator 8B–303 then is allowed to time out, causing an output pulse to be applied through the OR gate 8C–290 to trigger the error record flip-flop 8C–280 to its "1" state or "error" state of operation.

This output pulse from the oscillator 8B–303 also is applied to the 1A trigger input of an incomplete block register flip-flop 8D–304, the P1A priming input of which is permanently primed by the application of a positive potential thereto. The flip-flop 8D–304 is set to its "1" state and a positive signal is supplied from the "1" output through the OR gate 8B–299 to the inhibit input of the inhibit gate 8B–275 to block the passage of any pulses by that gate should transmission resume during the time that the receiving station is in the incomplete block mode of operation.

The positive potential obtained from the output of the OR gate 8B–299 also is inverted by the inverter 8B–300, triggering the gated oscillator 8B–301 into operation in the manner described previously in the description of the DEL mode of operation. This causes gated clock pulses to be obtained from the output of the OR gate 8B–276 and passed by the AND gate 8B–283 to continue to drive the one-shot multivibrator 9C–313 for the remainder of the block. The operation of the recording portion of the system is the same as if normal information were being received by the receiving station except that control of the station now is obtained from the incomplete block register flip-flop 8D–304 and the gated oscillator 8B–301 instead of from the receiving distributor sample pulse.

When a complete block of 80 characters has been punched, the programmer is stepped into the EOB mode, and the error correction cycle will begin because an error has been recorded by the error register flip-flop 8C–280.

The programmer then goes into the back up (BU) mode of operation, into the delete (DEL) mode, and returns to the SR mode of operation. In the SR mode of operation the receiving station awaits the decoding of an SR character in the character recognition matrix 7AC–241. When an SR character is detected, a positive output pulse is obtained from the output of the AND gate 6C–210 and is applied through an OR gate 6C–198 over a lead 6C–199, 8D–199 to the 0A trigger input of the incomplete block flip-flop 8D–304 setting the flip-flop to its "0" state, since the P0A priming input of the flip-flop is permanently connected to a source of positive potential. The system now is in its normal mode of operation, and resumption of normal transmission and reception may take place.

It should be noted that each time an output pulse is obtained from the inhibit gate 6A–204, this pulse also is passed through the OR gate 6C–198 to insure resetting of the incomplete block flip-flop 8D–304 prior to the receipt of each valid block of information.

It is possible to stop and reset the receiving station at any time by closing a make contact 9D–350. This causes a positive potential to be applied over a lead 9D–351, 8C–351 to force the error register flip-flop 8C–280 to remain in its error indicating mode of operation, that is set to its "1" state so long as a positive potential exists on this lead. This positive potential also is inverted by an inverter 9D–352, the output of which then is a negative potential applied to the inhibit input of an inhibit gate 9B–353. When the programmer then reaches the SR mode of operation, a positive potential is applied over the lead 6B–224, 9D–224 and is passed by the inhibit gate 9D–353 and the OR gate 9D–339 over the lead 9D–201, 6B–201 and through the OR gate 6B–202 back to the SR stage of the programmer 6AB–200 thus holding the programmer in the SR mode of operation so long as the contact 9D–350 remains closed.

At the same time a positive potential is applied over a lead 9D–355, 6C–355 to the inhibit input of the inhibit gate 6C–208, the output of which then remains at a negative potential preventing the AND gate 6C–210 from responding to an SR character detected by the character detection matrix 7AC–241. The positive potential obtained by closure of the contact 9D–350 also is applied to the "0" output of the flip-flop 9D–338, setting the flip-flop to its "0" state. In a similar manner this positive potential is applied over a lead 9D–356, 8D–356 to the 0B trigger input of the incomplete block flip-flop causing that flip-flop to be set to its "0" state, since the P0B priming input to the flip-flop is permanently connected to a source of positive potential.

The receiving station will remain in this state of operation until the switch 9D–350 is opened, thereby causing a negative potential to be applied to the leads 9D–351, 9D–355, 9D–356 and to the inverter 9D–352 and the "0" output terminal of the flip-flop 9D–338. When this is done, the station is returned to its original condition of operation whereupon it responds to the signals transmitted by it from the transmitting station.

What is claimed is:

1. A block synchronization circuit for use in a data transmission system employing the transmission of information in blocks, each having a predetermined number of characters, including:

- a receiving station;
- a transmitting station for normally continuously transmitting blocks of information to the receiving station;
- means for counting the blocks transmitted from the transmitting station;
- means for transmitting to the receiving station, in conjunction with each transmitted block of information, a block number corresponding to the output of the transmitter counting means;
- means for counting the blocks of information received by the receiving station;
- means for comparing the transmitted block number with the block number obtained from the output of the receiver counting means; and
- means responsive to the output of the comparing means for causing the receiving station to be nonresponsive to information transmitted to it for a predetermined number of blocks if a predetermined relationship exists between the compared block numbers.

2. A circuit according to claim 1 having means responsive to the output of the comparing means for causing retransmission of a predetermined number of blocks if at least one other predetermined relationship exists between the compared block numbers.

3. A circuit according to claim 1 wherein the transmitter and receiver counting means are cyclic counters having a predetermined count capacity.

4. A circuit according to claim 1 wherein the means for causing the receiving station to be nonresponsive is operated whenever the transmitted block number is low with respect to the block number generated at the receiver.

5. A circuit according to claim 1 wherein the predetermined number of blocks during which the receiving station is caused to be nonresponsive is one block.

6. A circuit according to claim 2 wherein the means for causing retransmission of a predetermined number of blocks is operated whenever the transmitted block number is high with respect to the block number obtained from the output of the receiver counting means.

7. A circuit according to claim 6 wherein the means for causing retransmission in response to a transmitted high block number causes the transmitting station to retransmit a block with a lower block number.

8. A circuit according to claim 6 wherein the means for causing retransmission of a predetermined number of blocks is operated whenever the transmitted block number is errored, the retransmission means being operated at different times in the cycle of operation of the circuit for errored block numbers and for transmitted high block numbers.

9. A circuit according to claim 8 wherein the means for causing retransmission operated in response to an errored block number causes the transmitting station to commence retransmission with the same block for which the block number was errored.

10. A circuit according to claim 3 wherein the cyclic counters have a capacity of at least three counts.

11. A block synchronization circuit for use in a data transmission system employing the transmission of information in blocks, each having a predetermined number of characters, including:

- a receiving station;
- a transmitting station for transmitting blocks of information to the receiving station;
- means for providing a first block count indication of the blocks transmitted from the transmitting station;
- means for transmitting to the receiving station the first block count indication corresponding to each block of information;
- means for providing a second block count indication of the blocks of information received by the receiving station;
- means for comparing said first and second block count indications; and
- means responsive to the output of the comparing means for causing retransmission of a predetermined number of blocks if a first predetermined relationship exists between the first and second block count indications; and
- means for causing the receiving station to be nonresponsive to information transmitted to it for a predetermined number of blocks if a second predetermined relationship exists between the first and second block count indications.

12. A circuit according to claim 11 wherein means for providing the first and second block count indications are cyclic counters having a predetermined capacity.

13. A circuit according to claim 11 wherein said first predetermined relation exists whenever the first block indication is high with respect to the second block count indication and the second predetermined relation exists whenever the first block count indication is low with respect to the second block count indication.

References Cited

UNITED STATES PATENTS

| | | |
|---|---|---|
| 2,313,980 | 3/1943 | Van Duuren. |
| 2,706,215 | 4/1955 | Van Duuren. |
| 2,735,889 | 2/1956 | Canfora. |
| 2,805,278 | 9/1957 | Van Duuren. |
| 2,846,007 | 8/1958 | Barbeau. |

| | | |
|---|---|---|
| 2,970,189 | 1/1961 | Van Dalen et al. |
| 2,985,714 | 5/1961 | Barbeau et al. |
| 3,001,017 | 9/1961 | Dirks. |
| 3,001,018 | 9/1961 | Van Dalen. |
| 3,131,377 | 4/1964 | Grondin. |
| 3,154,638 | 10/1964 | Van Dalen. |
| 3,381,272 | 4/1968 | Pasini. |
| 3,388,378 | 6/1968 | Steeneck et al. |

DONALD J. YUSKO, Primary Examiner

U.S. Cl. X.R.

178—23; 340—146.1